United States Patent
Jung et al.

(10) Patent No.: US 10,581,265 B2
(45) Date of Patent: Mar. 3, 2020

(54) VOLTAGE GENERATING METHOD AND APPARATUS

(71) Applicant: SAMSUNG ELECTRONICS CO., LTD., Suwon-si (KR)

(72) Inventors: Seungchul Jung, Suwon-si (KR); JongPal Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 15/440,384

(22) Filed: Feb. 23, 2017

(65) Prior Publication Data

US 2017/0373525 A1 Dec. 28, 2017

(30) Foreign Application Priority Data

Jun. 24, 2016 (KR) .................... 10-2016-0079149

(51) Int. Cl.
  *H02J 7/34* (2006.01)
  *H02J 50/12* (2016.01)
  *H02J 7/02* (2016.01)

(52) U.S. Cl.
  CPC .............. *H02J 7/345* (2013.01); *H02J 7/025* (2013.01); *H02J 50/12* (2016.02)

(58) Field of Classification Search
  CPC ............. H02J 7/025; H02J 7/345; H02J 50/12
  USPC ................................................ 320/108, 140
  See application file for complete search history.

(56) References Cited

U.S. PATENT DOCUMENTS

| | | | |
|---|---|---|---|
| 8,907,723 B2 | 12/2014 | Onizuka et al. | |
| 2014/0028110 A1* | 1/2014 | Petersen | H02J 7/025 307/104 |
| 2014/0054970 A1 | 2/2014 | Keeling et al. | |
| 2015/0155095 A1* | 6/2015 | Wu | H02J 17/00 307/104 |
| 2015/0207336 A1 | 7/2015 | Morreale et al. | |

FOREIGN PATENT DOCUMENTS

| | | |
|---|---|---|
| JP | 5443650 B2 | 12/2013 |
| JP | 2014-110733 A | 6/2014 |
| KR | 10-2012-0128099 A | 11/2012 |
| KR | 10-2014-0071233 A | 6/2014 |
| KR | 10-1470815 B1 | 12/2014 |
| KR | 10-2015-0076001 A | 7/2015 |
| KR | 10-2015-0084615 A | 7/2015 |
| KR | 10-2015-0101197 A | 9/2015 |

(Continued)

OTHER PUBLICATIONS

Lee, Hyung-Min, et al. "An Adaptive Reconfigurable Active Voltage Doubler/Rectifier for Extended-Range Inductive Power Transmission." *IEEE Transactions on Circuits and Systems II: Express Briefs* 59.8, Aug. 2012: 481-485. (5 pages, in English).

(Continued)

*Primary Examiner* — Richard V Muralidar
(74) *Attorney, Agent, or Firm* — NSIP Law

(57) ABSTRACT

Provided are a voltage generating method and apparatus. A wireless power device includes a boosting circuit configured to generate a high voltage, and a switch arrangement circuit configured to selectively transmit energy to the boosting circuit, for the generating of the high voltage, using an inductor included in a resonator and in response to a build-up request for the high voltage.

17 Claims, 25 Drawing Sheets

(56) References Cited

FOREIGN PATENT DOCUMENTS

WO    WO 2010/125864 A1    11/2010
WO    WO 2011/030804 A1    3/2011

OTHER PUBLICATIONS

Li, Xing, et al. "A 13.56 MHz Wireless Power Transfer System With Reconfigurable Resonant Regulating Rectifier and Wireless Power Control for Implantable Medical Devices." *IEEE Journal of Solid-State Circuits* 50.4 Apr. 2015: 978-989. (12 pages, in English).

* cited by examiner

<Energy build-up operation>

<Energy release operation>

<Energy build-up operation>

<Energy release operation>

<Energy release operation & Energy transfer operation>

<Energy release operation & Energy transfer operation>

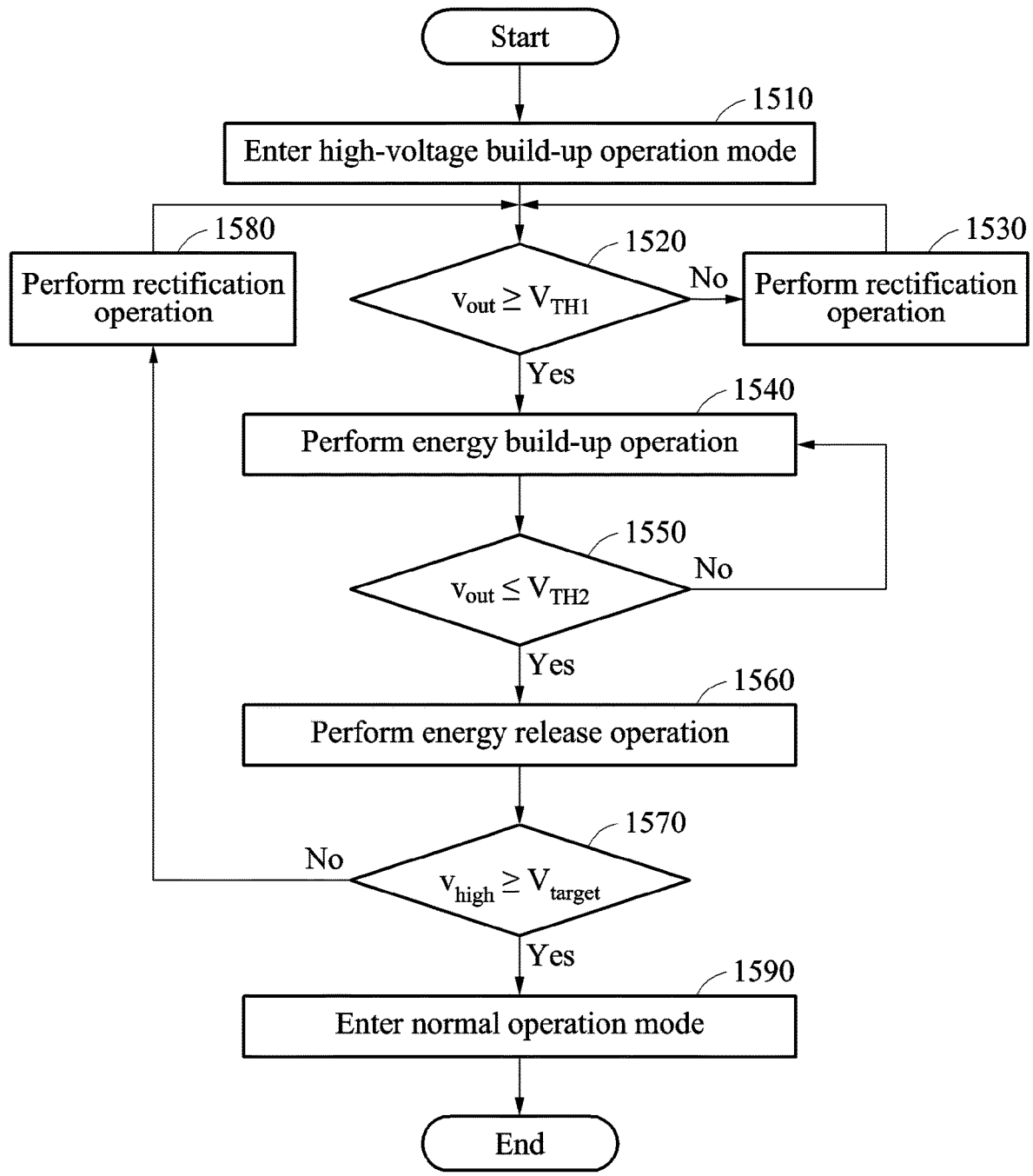

VOLTAGE GENERATING METHOD AND APPARATUS

CROSS-REFERENCE TO RELATED APPLICATION

This application claims the benefit under 35 USC § 119(a) of Korean Patent Application No. 10-2016-0079149 filed on Jun. 24, 2016, in the Korean Intellectual Property Office, the entire disclosure of which is incorporated herein by reference for all purposes.

BACKGROUND

1. Field

The following description relates to a voltage generating method and apparatus.

2. Description of Related Art

A receiver configured to receive wireless power may receive and rectify an alternating current (AC) voltage with a relatively low peak voltage. In general, the rectified voltage is charged in a capacitor and used as received, or used after undergoing a boosting process, such as when the low peak voltage is insufficient to charge a battery of an underlying device.

The boosting process may include boosting the received voltage through a boost type converter. The boost type converter may include an additional inductor and two switches, and may be configured to increase an input-to-output voltage. For example, the boost type converter may adjust energy to be built-up in the inductor by adjusting duty cycles of the switches, thereby regulating an output voltage.

The received voltage may be boosted through a switched capacitor converter that increases the voltage using switching of a series and/or parallel structure of capacitors, rather than using such an inductor.

The boost type converter may require an additional external device, such as the inductor. Since a boosting ratio is determined for each operation in general, the switched capacitor converter may also need to perform a number of operations to obtain an increasingly greater input-to-output voltage, and thus may require more and more capacitors to obtain this higher output voltage.

When the abovementioned approaches are included in a chip of a receiver, the corresponding devices that implement the approaches may occupy a large area of the corresponding chip or printed circuit. In addition, when such approaches require additional devices disposed external to the chip to obtain greater and greater input-to-output voltage, the number of such external devices also increases.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a wireless power device includes a boosting circuit configured to generate a high voltage, and a switch arrangement circuit configured to selectively transmit energy to the boosting circuit, for the generating of the high voltage, using an inductor included in a resonator and in response to a build-up request for the high voltage.

The switch arrangement circuit may be configured to iteratively transmit the energy for the generating of the high voltage to the boosting circuit until a voltage stored in the boosting circuit reaches the high voltage.

The boosting circuit may include a diode configured to transmit energy transmitted from the switch arrangement circuit, and a capacitor configured to store the transmitted energy by the diode.

The wireless power device may further include a first capacitor configured to store a resonant voltage generated by a resonance of the resonator, where the energy selectively transmitted to the boosting circuit may include at least one of energy corresponding to the resonant voltage stored in the first capacitor or energy charged in a battery.

The switch arrangement circuit may be configured to transmit the energy charged in the battery to the boosting circuit using the inductor and to transmit, to the boosting circuit, energy stored by at least one of the first capacitor or a second capacitor configured to store the energy charged in the battery.

The wireless power device may further include the resonator configured to resonate to generate a resonant voltage in response to receipt of wireless power by the inductor, and configured to build energy, in the inductor, provided by the switch arrangement circuit during the use of the inductor for the selective transmitting of energy to the boosting circuit.

In a general aspect, a wireless power device includes a resonator configured to resonate to generate a resonant voltage through a wireless power receiving inductor of the resonator, and a power converter configured to generate a high voltage from a low voltage by building energy in the inductor in response to a build-up request for outputting the high voltage.

The power converter may further include a boosting circuit configured to generate the high voltage, and a switch arrangement circuit configured to selectively transmit energy to the boosting circuit, for the generating of the high voltage, using the inductor built energy.

The switch arrangement circuit may be configured to iteratively transmit the energy to the boosting circuit until a voltage stored in the boosting circuit reaches the high voltage.

The boosting circuit may include a diode configured to transmit energy transmitted from the switch arrangement circuit, and a capacitor configured to store the transmitted energy by the diode.

The power converter may further include a first capacitor configured to store the resonant voltage, where the energy selectively transmitted to the boosting circuit may include at least one of energy corresponding to the resonant voltage stored in the first capacitor or energy charged in a battery.

The switch arrangement circuit may be configured to transmit the energy charged in the battery to the boosting circuit using the inductor and to transmit, to the boosting circuit, energy stored by at least one of the first capacitor or a second capacitor configured to store the energy charged in the battery.

The wireless power device may further include a controller configured to generate the build-up request in response to a determination that the wireless power device requires a high voltage.

In one general aspect, a voltage generating method of a wireless power receiver may include entering a high-voltage build-up operation mode in response to a build-up request for outputting a high voltage for power supply to the wireless power receiver, and generating the high voltage from a low voltage by storing energy, from the wireless power receiver, in a wireless power receiving inductor included in a resonator of the wireless power receiver during the high-voltage build-up operation mode.

The generating of the high voltage may include iteratively transmitting the stored energy to an energy storage, until a voltage stored in the energy storage reaches the high voltage, to generate the high voltage.

The storing of the energy in the wireless power receiving inductor may include providing, to the wireless power receiving inductor, at least one of energy corresponding to a resonant voltage generated by the resonator or energy charged in a battery.

The generating of the high voltage may include transmitting the stored energy, including the energy charged in the battery, in the wireless power receiving inductor to an energy storage, and transmitting, to the energy storage, energy stored in at least one of a first capacitor configured to store the resonant voltage or a second capacitor configured to store the energy charged in the battery.

The method may further include generating the build-up request in response to a determination that the high voltage is required by the wireless power receiver.

The generating of the high voltage may be performed during wireless power transmission of energy to the wireless power receiving inductor from a wireless power transmitter, and the stored energy from the wireless power receiver may be previously stored energy provided by the wireless power receiving inductor during the wireless power transmission.

The previously stored energy may be energy available to the wireless power receiver, as a power supply to the wireless power receiver, for a low voltage operation.

Other features and aspects will be apparent from the following detailed description, the drawings, and the claims.

BRIEF DESCRIPTION OF THE DRAWINGS

FIG. 15 is a flowchart illustrating an example of an operation of a power converter.

Figure 1:
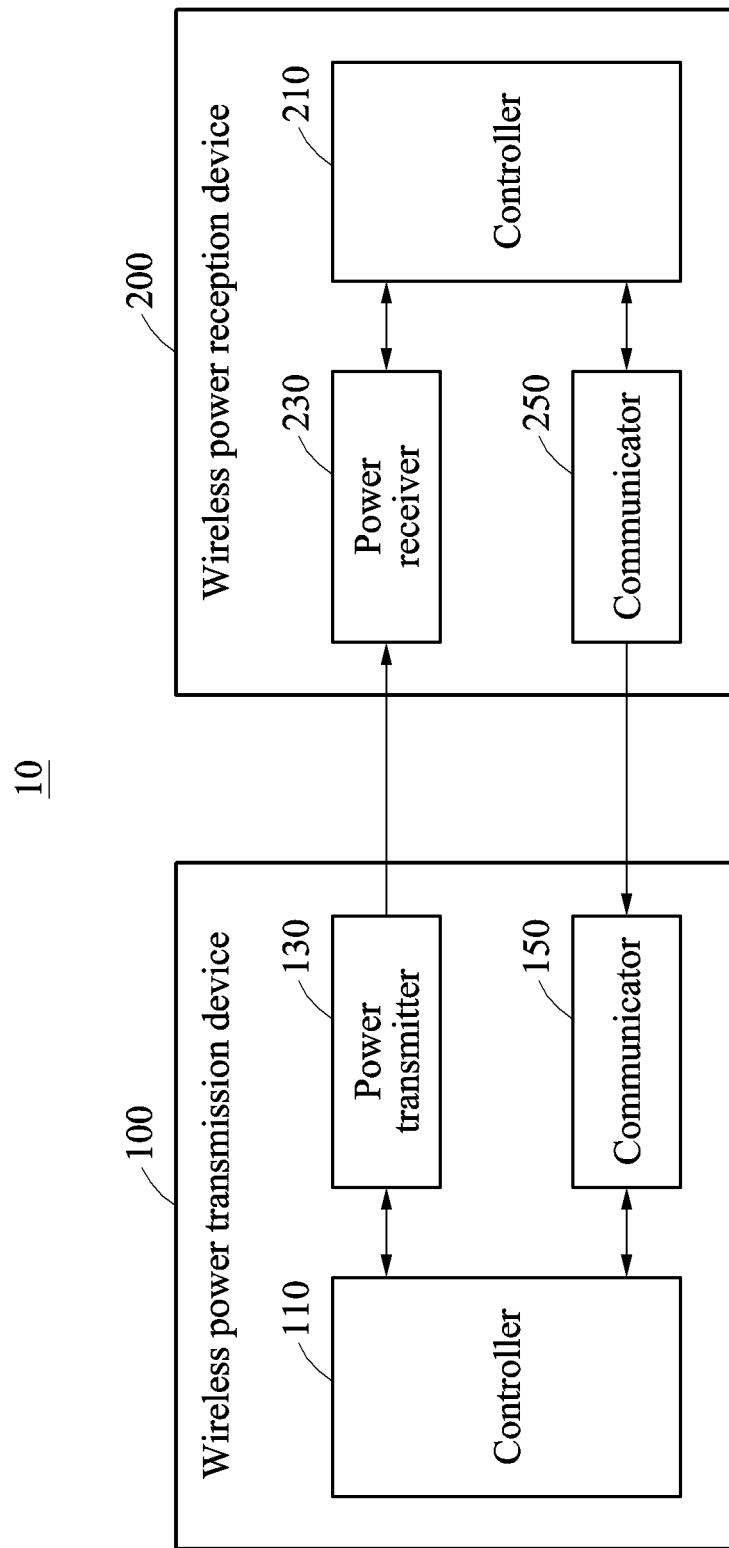
FIG. 1 is a diagram illustrating an example of a wireless power system in accordance with one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that a first component is "connected," "coupled," or "joined" to a second component, a third component may be "connected," "coupled," and "joined" between the first and second components, although the first component may also be directly connected, coupled or joined to the second component. For example, it should be noted that if it is described in the specification that one component is "directly connected" or "directly joined" to another component, a third component would not be present therebetween. Similar to such direct connection or joined expressions, other expressions, for example, "between" and "immediately between" and "adjacent to" and "immediately adjacent to" may also be construed as described in the foregoing.

The terminology used herein is for the purpose of describing various examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains that is consistent, and not in conflict, with an understanding of the present disclosure and the use of such terms in the present disclosure. Terms, such as those defined in commonly used dictionaries, are to be interpreted as having a meaning that is consistent with their meaning in the context of the relevant art and consistent with an understanding of the present disclosure, and are not to be interpreted in an idealized or overly formal sense unless expressly so defined herein.

FIG. 1 is a diagram illustrating an example of a wireless power system in accordance with one or more embodiments.

Referring to FIG. 1, a wireless power system 10 may include a wireless power transmission device 100 and a wireless power reception device 200, for example.

The wireless power transmission device 100 may supply wireless power to the wireless power reception device 200. In this example arrangement, the wireless power transmission device 100 refers to a device that supplies wireless power, and the wireless power reception device 200 refers to a device that receives the wireless power.

The wireless power transmission device 100 and the wireless power reception device 200 may also communicate with each other. For example, the wireless power transmission device 100 and the wireless power reception device 200 may exchange signals or data with each other.

Depending on embodiment, each of the wireless power transmission device 100 and the wireless power reception device 200 is any of a personal computer (PC), a data server, a pad, a medical device, an electric vehicle, or a portable electronic device, as only examples.

As also only examples, the portable electronic device may be implemented as a laptop computer, a mobile phone, a smart phone, a tablet PC, a mobile Internet device (MID), a personal digital assistant (PDA), an enterprise digital assistant (EDA), a digital still camera, a digital video camera, a portable multimedia player (PMP), a personal navigation device or portable navigation device (PND), a handheld game console, an electronic book (e-book), or a smart device. For example, the smart device may be implemented as a smart watch or a smart band, or some other wearable device.

The wireless power transmission device 100 includes a controller 110, a power transmitter 130, and a communicator 150, for example.

The controller 110 may control an overall operation of the wireless power transmission device 100. In an example, the controller 110 may be implemented as a processor including at least one core, for example, a central processing unit (CPU), though embodiments are not limited thereto.

The power transmitter 130 may transmit wireless power to the wireless power reception device 200.

The communicator 150 may exchange signals or data with the wireless power reception device 200, such as through the communicator 250 of the wireless power reception device 200. The communicator 150 may be implemented as hardware as a near field communication (NFC) module, a wireless-fidelity (Wi-Fi) module, a Bluetooth module, a Bluetooth low energy (BLE) module, a radio frequency identification (RFID) module, an infrared data association (IrDA) module, a ultra wideband (UWB) module, or a Zigbee module, as only non-limiting examples.

The wireless power reception device 200 includes a controller 210, a power receiver 230, and a communicator 250, for example.

The controller 210 may control an overall operation of the wireless power reception device 200. In an example, the controller 210 may be implemented as a processor including at least one core, for example, a CPU, though embodiments are not limited thereto.

The power receiver 230 receives wireless power from the wireless power transmission device 100. In this example, the power receiver 230 outputs a normal voltage and/or a low voltage using the received wireless power. Further, the power receiver 230 generates a high voltage by storing energy via an internal inductor of a resonator included in the power receiver 230 in response to a build-up request for the high voltage, e.g., a same internal inductor of the resonator that is used to receive the wireless power transfer from the wireless power transmission device 100.

The communicator 250 exchanges signals or data with the wireless power transmission device 100. The communicator 250 may be implemented as an NFC module, a Wi-Fi module, a Bluetooth module, a BLE module, an RFID module, an IrDA module, a UWB module, or a Zigbee module.

In response to a determination, e.g., by the wireless power reception device 200, that the wireless power reception device 200 requires a high voltage, the wireless power reception device 200 generates the high voltage using the internal inductor of the resonator which is already provided for receiving wireless power from the wireless power transmission device 100, and thus does not need an additional boost providing external device, such as an external inductor and/or capacitor as typically required. Accordingly, a wireless power reception device according to one or more embodiments may reduce a number of external devices, and also reduce an area occupied by such external devices.

Figure 2:
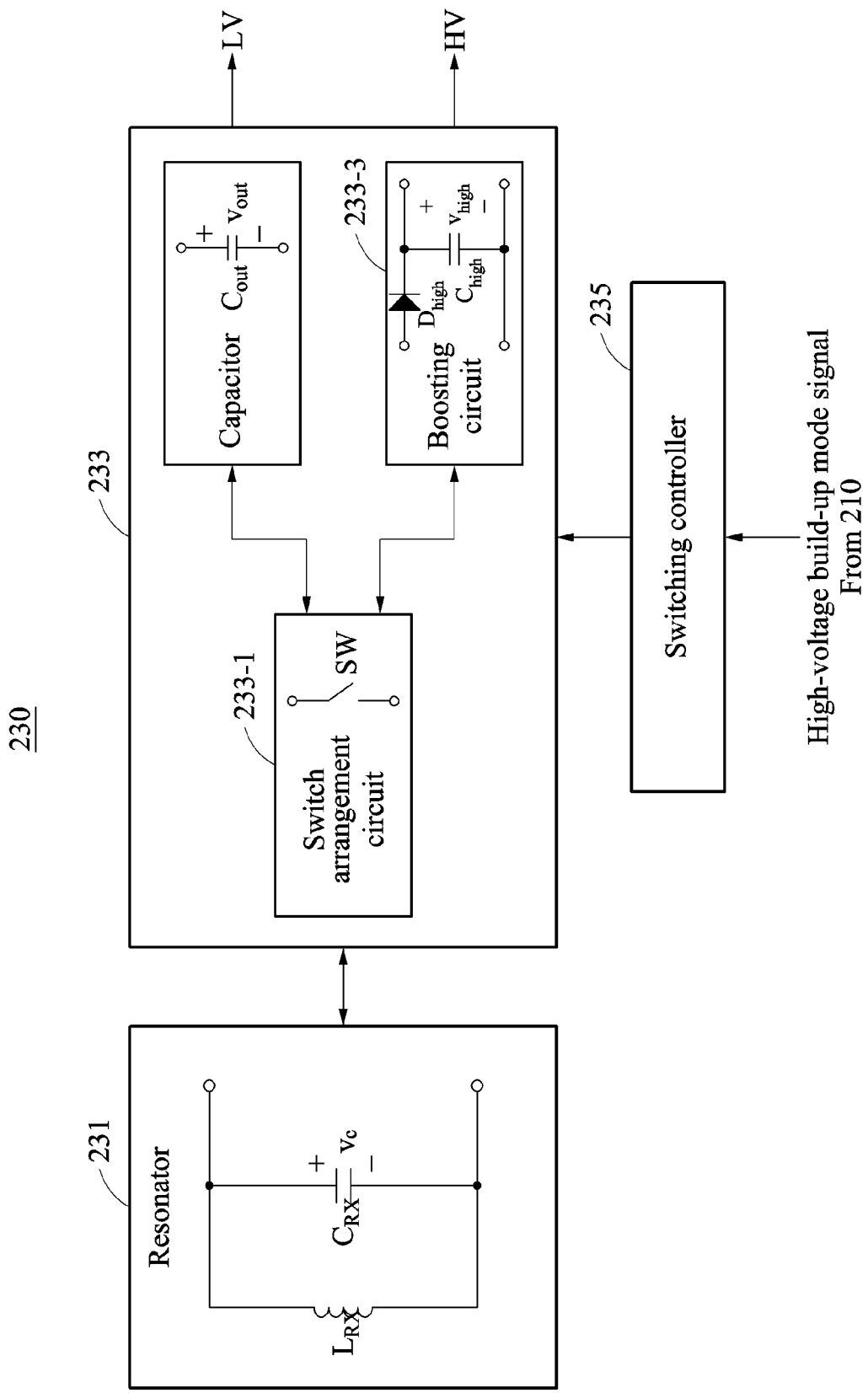
FIG. 2 is a block diagram illustrating an example of a power receiver.

FIG. 2 is a block diagram illustrating an example of a power receiver of FIG. 1.

Referring to FIG. 2, the power receiver 230 includes a resonator 231, and a power converter 233. The power receiver 230 further includes a switching controller 235.

The resonator 231 includes an inductor $L_{RX}$ and a capacitor $C_{RX}$. The resonator 231 generates a resonant voltage by receiving wireless power transmitted from the wireless power transmission device 100. The resonant voltage is generated in the capacitor $C_{RX}$. In this example, the resonant voltage is a resonant alternating current (AC) voltage, and is maintained at a predetermined (and/or alternatively desired) peak voltage.

The power converter 233 selectively operates in a normal operation mode and a high-voltage build-up operation mode under control of the switching controller 235. During the normal operation mode, the power converter 233 generates a first voltage LV using the voltage generated in the capacitor $C_{RX}$, and outputs the first voltage LV. During the high-voltage build-up operation mode, the power converter 233 generates a second voltage HV using the inductor $L_{RX}$, and outputs the second voltage HV.

The first voltage LV includes a normal voltage and/or a low voltage, and the second voltage HV includes a high voltage. In detail, the normal operation mode is a mode that provides a normal and/or low voltage required by the wireless power reception device 200, and the high-voltage build-up operation mode is a mode that provides a high voltage required by the wireless power reception device 200. Herein, the high voltage is a greater voltage than the normal and low voltage.

The power converter 233 includes a capacitor $C_{out}$, a switch arrangement circuit 233-1, and a boosting circuit 233-3, for example.

The capacitor $C_{out}$ stores energy corresponding to the wireless power transmitted from the wireless power transmission device 100 in a form of voltage. The capacitor $C_{out}$ stores the resonant voltage generated in the capacitor $C_{RX}$ by a resonance of the resonator 231. The resonant voltage is rectified through the switch arrangement circuit 233-1.

The switch arrangement circuit 233-1 operates in the normal operation mode under control of the switching controller 235.

The switch arrangement circuit 233-1 rectifies the resonant voltage generated in the capacitor $C_{RX}$ and transmits the rectified voltage to the capacitor $C_{out}$. The voltage $v_{out}$ stored in the capacitor $C_{out}$ is output as the first voltage LV. The switch arrangement circuit 233-1 performs a rectification operation.

Further, the switch arrangement circuit 233-1 operates in the high-voltage build-up operation mode under control of the switching controller 235. For example, the switch arrangement circuit 233-1 transmits energy to a capacitor $C_{high}$ of the boosting circuit 233-3 via the inductor $L_{RX}$. The switch arrangement circuit 233-1 performs an energy build-up operation to transmit energy to (or build up energy in) the inductor $L_{RX}$, or an energy release operation to transmit the energy transmitted to the inductor $L_{RX}$ to the capacitor $C_{high}$ of the boosting circuit 233-3. The switch arrangement circuit 233-1 also performs an energy transfer operation to store energy in a storage device before transmitting the energy to the inductor $L_{RX}$.

Until the energy stored in the capacitor $C_{high}$, that is, a voltage $v_{high}$ is determined to correspond to a preset value, for example, a predetermined high voltage, the switch arrangement circuit 231 may be controlled to iteratively transmit the energy to the capacitor $C_{high}$ via the inductor $L_{RX}$. The voltage $v_{high}$ stored in the capacitor $C_{high}$ is output as the second voltage HV.

The boosting circuit 233-3 includes a diode $D_{high}$ and the capacitor $C_{high}$. The capacitor $C_{high}$ stores the energy transmitted via the inductor $L_{RX}$ through the diode $D_{high}$.

The switching controller 235 controls the power converter 233, for example, an operation of the switch arrangement circuit 233-1. Although FIG. 2 illustrates the switching controller 235 being implemented external to a controller 210, such as the controller 210 of FIG. 1, examples are not limited respectively thereto. In another example, the switching controller 235 may be implemented internal to the controller 210.

In an example, except for when the wireless power reception device 200 requires a high voltage, the switching controller 235 controls the switch arrangement circuit 233-1 to operate in the normal operation mode. Alternatively, in response to the wireless power reception device 200 determining that a normal voltage and/or a low voltage is required by the wireless reception device 200, the controller 210 transmits a normal operation mode signal for the normal operation mode to the switching controller 235. In response to the normal operation mode signal, the switching controller 235 controls the switching controller 235 to operate in the normal operation mode.

In response to a determination that the wireless power reception device 200 requires a high voltage, the switching controller 235 controls the switch arrangement circuit 233-1 to operate in the high-voltage build-up operation mode under control of the controller 210. In this example, the controller 210 generates a high-voltage build-up operation mode signal for a build-up request for a high voltage, and transmits the high-voltage build-up operation mode signal to the switching controller 235.

The rectification operation, the energy build-up operation, the energy release operation, and/or the energy transfer operation of the switch arrangement circuit 233-1 may be performed by controlling an operation of at least one switch device SW included in the switch arrangement circuit 233-1 through the switching controller 235. Hereinafter, the operation of such a switch device SW, e.g., controlled by the switching controller 235, will be described in greater detail.

Figure 3A:
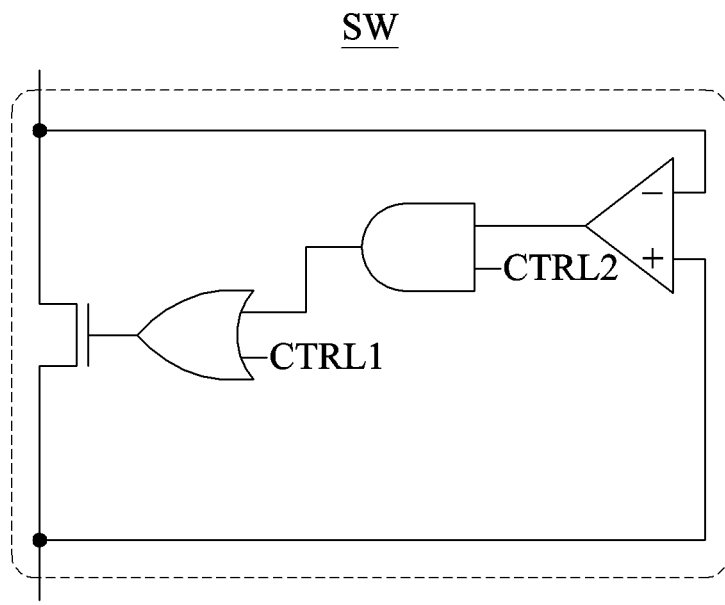
FIG. 3A illustrates an example of a switch device.
Figure 3B:
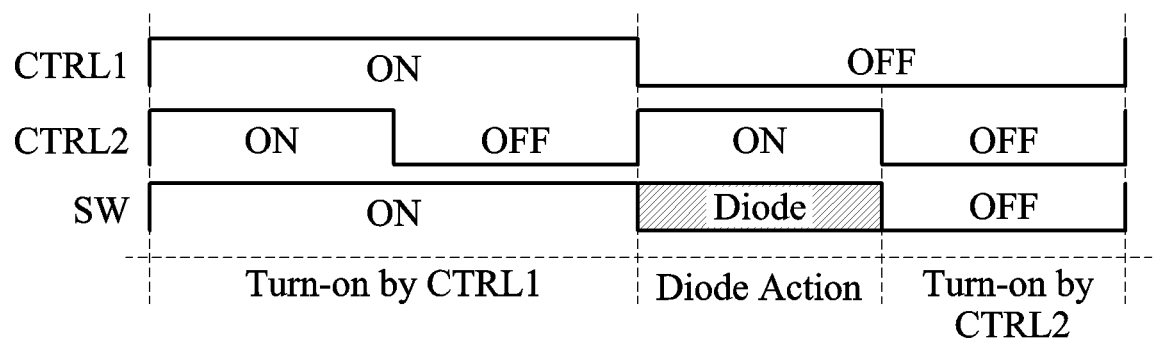
FIG. 3B is a timing diagram illustrating an example of an operation of a switch device.

FIG. 3A illustrates an example of a switch device, and FIG. 3B is a timing diagram illustrating an example of an operation of the switch device. Here, the switch device of FIG. 3A may be the switch device of FIG. 2, though embodiments are not limited thereto.

Referring to FIGS. 3A and 3B, the switch device SW includes a plurality of logic circuits, a transistor, and a comparator, for example. However, the switch device SW is not limited thereto, and may be implemented using various circuits and/or methods.

The example switch device SW operates in response to control signals CTRL1 and CTRL2 generated by the switching controller 235, for example. As an example, a first level of the control signals CTRL1 and CTRL2 corresponds to a high level or logic 1, and a second level thereof corresponds to a low level or logic 0.

The switch device SW may act as an active diode in response to the control signals CTRL1 and CTRL2. For example, in response to the first control signal CTRL1 corresponding to the second level and the second control signal CTRL2 corresponding to the first level, the switch device SW acts as a diode.

The switch device SW may selectively be turned on and off in response to the control signals CTRL1 and CTRL2. For example, in response to the first control signal CTRL1 corresponding to the first level, the switch device SW is turned on, and in response to the first control signal CTRL1 corresponding to the second level and the second control signal CTRL2 corresponding to the second level, the switch device SW is turned off.

Through use of at least one switch device SW being selectively controlled to act as a diode, to be turned on, and/or to be turned off, the switch arrangement circuit 233-1 may selectively perform any of the rectification operation, the energy build-up operation, the energy release operation, and/or the energy transfer operation.

Hereinafter, various examples of generating a high voltage using a boosting circuit will be described with reference to FIGS. 4-14D. For explanation purposes only, and noting that embodiments are not limited thereto, such examples will be explained with reference to the capacitor $C_{high}$ of the boosting circuit 233-3 of FIG. 2 using the inductor $L_{RX}$ of the resonator 231 of FIG. 2.

For example, though not limited thereto, the power converter 233 of FIG. 2 may output the high voltage $v_{high}$ generated in the capacitor $C_{high}$ as the second voltage HV in response to the switch arrangement circuit 233-1 transmitting the energy stored in the capacitor $C_{out}$ through the rectification operation to the capacitor $C_{high}$ of the boosting circuit 233-3 via the inductor $L_{RX}$, such as will be described with reference to FIGS. 4 through 8B.

Figure 4:
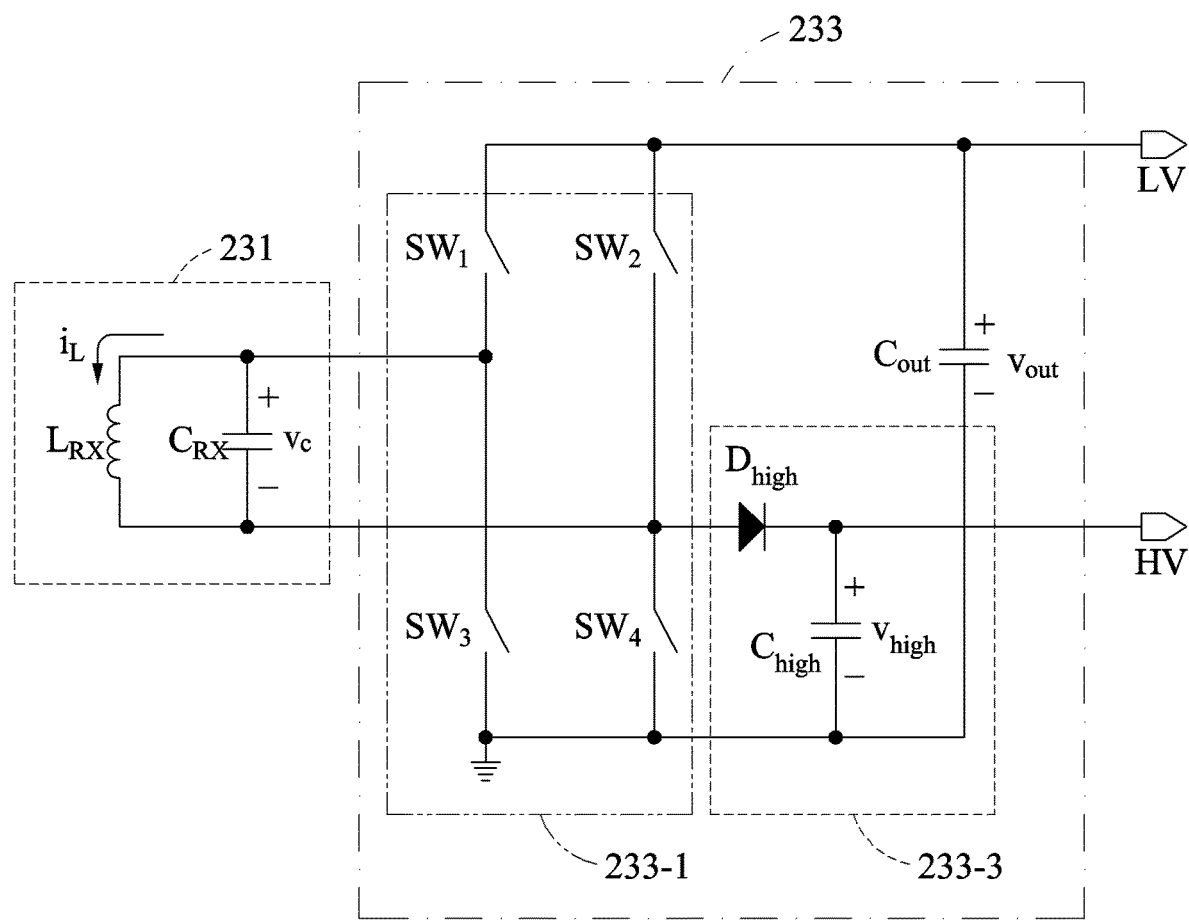
FIG. 4 is a circuit diagram illustrating an example of a power converter.
Figure 5A:
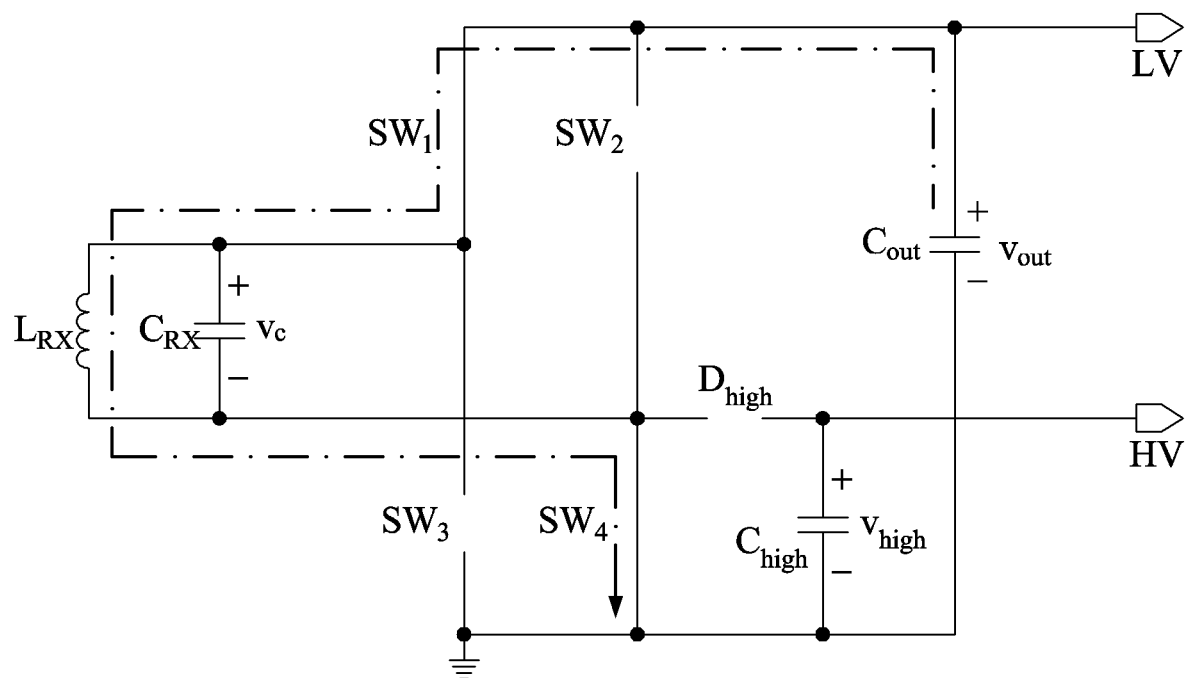
FIGS. 5A and 5B are circuit diagrams illustrating examples of operations of a switch arrangement circuit.
Figure 5B:
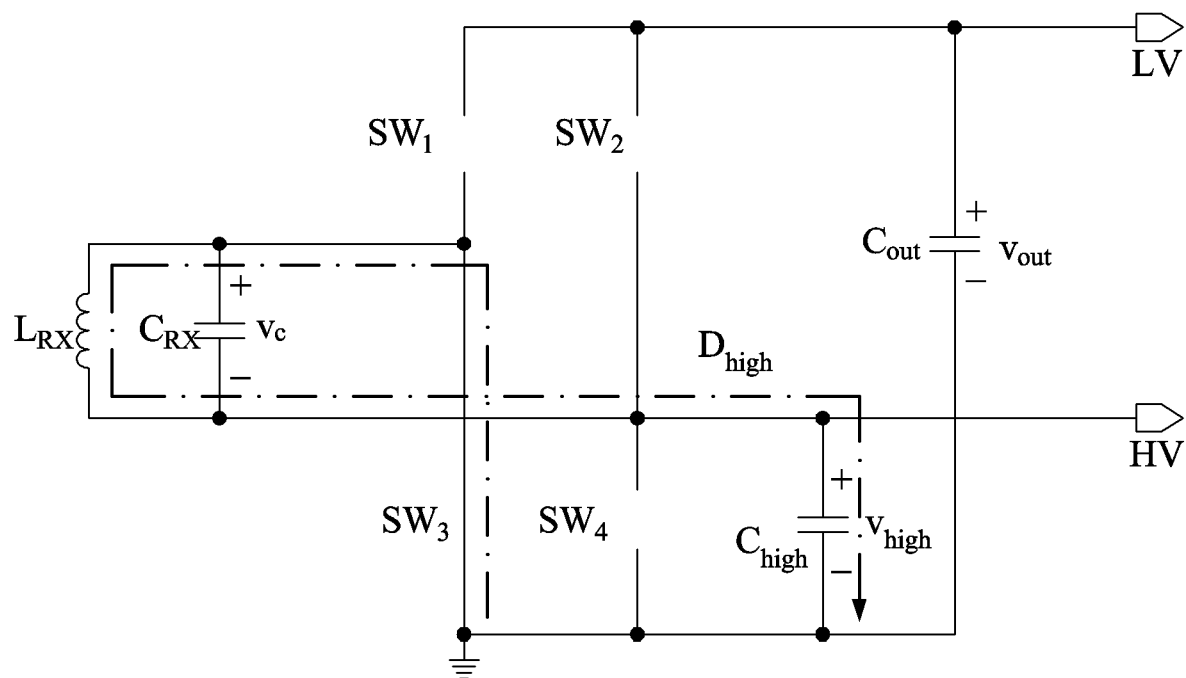
Figure 6:
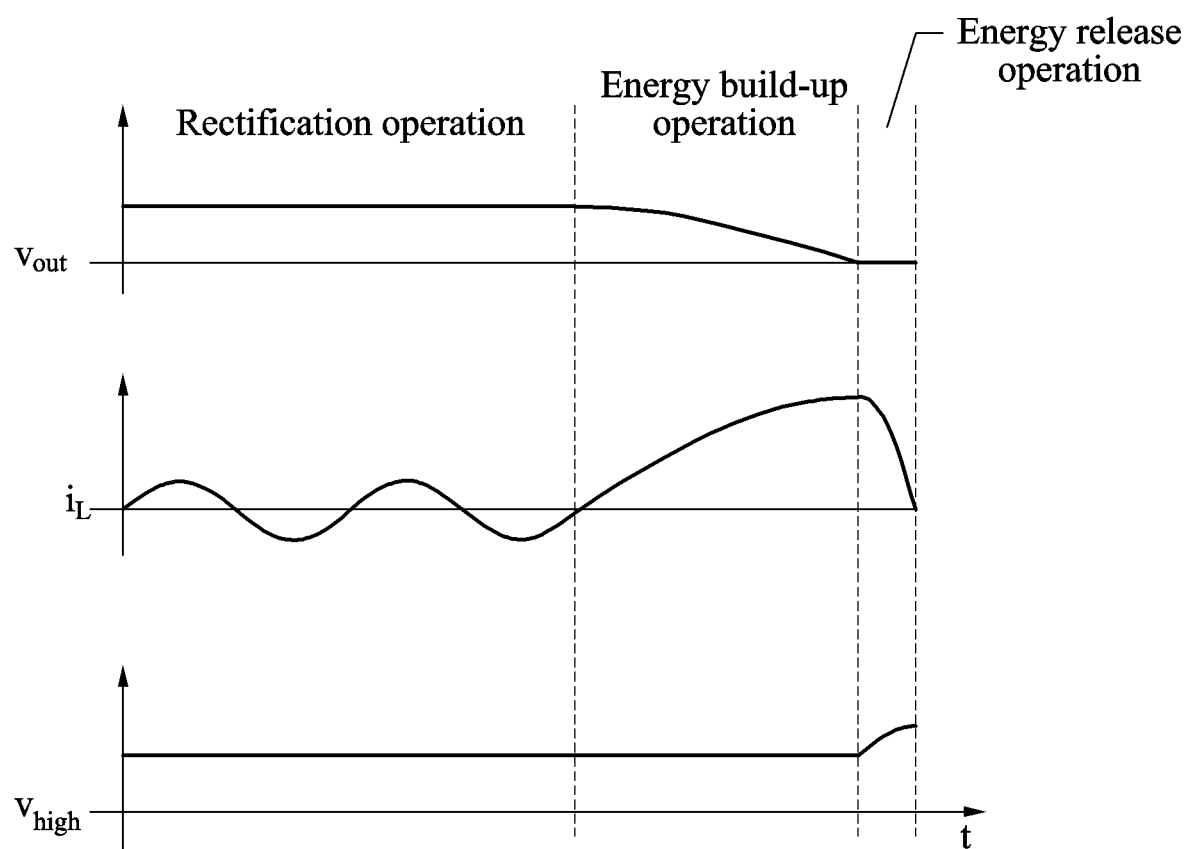
FIG. 6 is a graph illustrating an example of a relationship among energies generated and transmitted based on operations of a switch arrangement circuit.

For example, FIG. 4 is a circuit diagram illustrating an example of such a power converter, FIGS. 5A and 5B are circuit diagrams illustrating examples of operations of a switch arrangement circuit of FIG. 4, and FIG. 6 is a graph illustrating an example of a relationship among energies generated and transmitted based on operations of the switch arrangement circuit of FIG. 4.

Referring to FIGS. 4 through 6, a switch arrangement circuit 233-1, such as the switch arrangement circuit 233-1 of FIG. 2, includes a plurality of switch devices $SW_1$, $SW_2$, $SW_3$, and $SW_4$. Structures and operations of the first switch device $SW_1$, the second switch device $SW_2$, and the fourth switch device $SW_4$ may each be substantially the same as the structure and the operation of the switch device SW of FIGS. 3A and 3B, noting that embodiments are not limited thereto. In FIG. 4, the third switch device $SW_3$ may be implemented as or by a diode. The third switch device $SW_3$ may also be substantially the same as the structure and operation of the switch device SW of FIGS. 3A and 3B.

For ease of description of FIG. 4, an example exists where a power converter 233, such as the power converter 233 of FIG. 2, operates in a normal operation mode, and a resonant voltage generated in the capacitor $C_{RX}$ using wireless power is rectified and stored in the capacitor $C_{out}$ in a form of direct current (DC) voltage. In this example, with the third switch device $SW_3$ being implemented as a diode, the first switch device $SW_1$, the second switch device $SW_2$, and the fourth switch device $SW_4$ may be controlled to also act as diodes.

A switching controller 235, such as the switching controller 235 of FIG. 2, may then or alternatively control the power converter 233 to operate in a high-voltage build-up operation mode, e.g., in response to a high-voltage build-up operation mode signal.

For an energy build-up operation, the switching controller 235 turns on the first switch device $SW_1$ and the fourth switch device $SW_4$, and turns off the second switch device $SW_2$. Thus, as shown in FIG. 5A, the energy stored in the capacitor $C_{out}$ in the form of voltage is transmitted to (or built up in) the inductor $L_{RX}$ in a form of current. In response to a determined capacitance of the capacitor $C_{out}$ being greater than a capacitance of the capacitor $C_{RX}$, the energy transmitted to the inductor $L_{RX}$ is transmitted in a form of resonance of the capacitor $C_{out}$ and the inductor $L_{RX}$.

For an energy release operation, the switching controller 235 turns off the first switch device $SW_1$, and controls the fourth switch device $SW_4$ to act as a diode. Further, the switching controller 235 maintains the second switch device $SW_2$ to be turned off. In this example, in response to a determined preset amount of the energy stored in the capacitor $C_{out}$ being transmitted to the inductor $L_{RX}$, the switching controller 235 initiates the energy release operation. Thus, as shown in FIG. 5B, the energy of the inductor $L_{RX}$ is transmitted to the capacitor $C_{high}$ through the third switch device $SW_3$ and the diode $D_{high}$.

In response to the entire amount of the energy of the inductor $L_{RX}$ being transmitted to the capacitor $C_{high}$, and with the third switch device $SW_3$ being implemented as a diode, the switching controller 233 controls the first switch device $SW_1$, the second switch device $SW_2$, and the fourth switch device $SW_4$ to act as diodes for a rectification operation. The switching controller 233 controls the first switch device $SW_1$ and the second switch device $SW_2$ to act as diodes. Further, the switching controller 233 maintains the fourth switch device $SW_4$ to act as a diode. Thus, the resonant voltage generated in the capacitor $C_{RX}$ by the resonance of the resonator 231 is rectified through the plurality of switch devices $SW_1$ through $SW_4$, and stored in the capacitor $C_{out}$ in a form of DC voltage. The energy stored in the capacitor $C_{out}$ is then again transmitted to the capacitor $C_{high}$ through the energy build-up operation and the energy release operation.

Until a voltage $v_{high}$ corresponding to the energy stored in the capacitor $C_{high}$ is determined to correspond to or reach a predetermined high voltage, the rectification operation, the energy build-up operation, and the energy release operation may be controlled to be iteratively performed.

In this example, a relationship among energies generated and transmitted in response to the rectification operation, the energy build-up operation, and the energy release operation of the switch arrangement circuit 233-1 is shown in FIG. 6. For example, during the rectification operation, the energy stored in the capacitor $C_{out}$, that is, the voltage $v_{out}$ may be maintained. During the energy build-up operation, the energy stored in the capacitor $C_{out}$ is transmitted to the inductor $L_{RX}$, and the energy of the inductor $L_{RX}$, that is, a current $i_L$ increases. During the energy release operation, the energy of the inductor $L_{RX}$ is transmitted to the capacitor $C_{high}$ of the boosting circuit 233-3, and the energy stored in the capacitor $C_{high}$, that is, the voltage $v_{high}$ increases.

Figure 7:
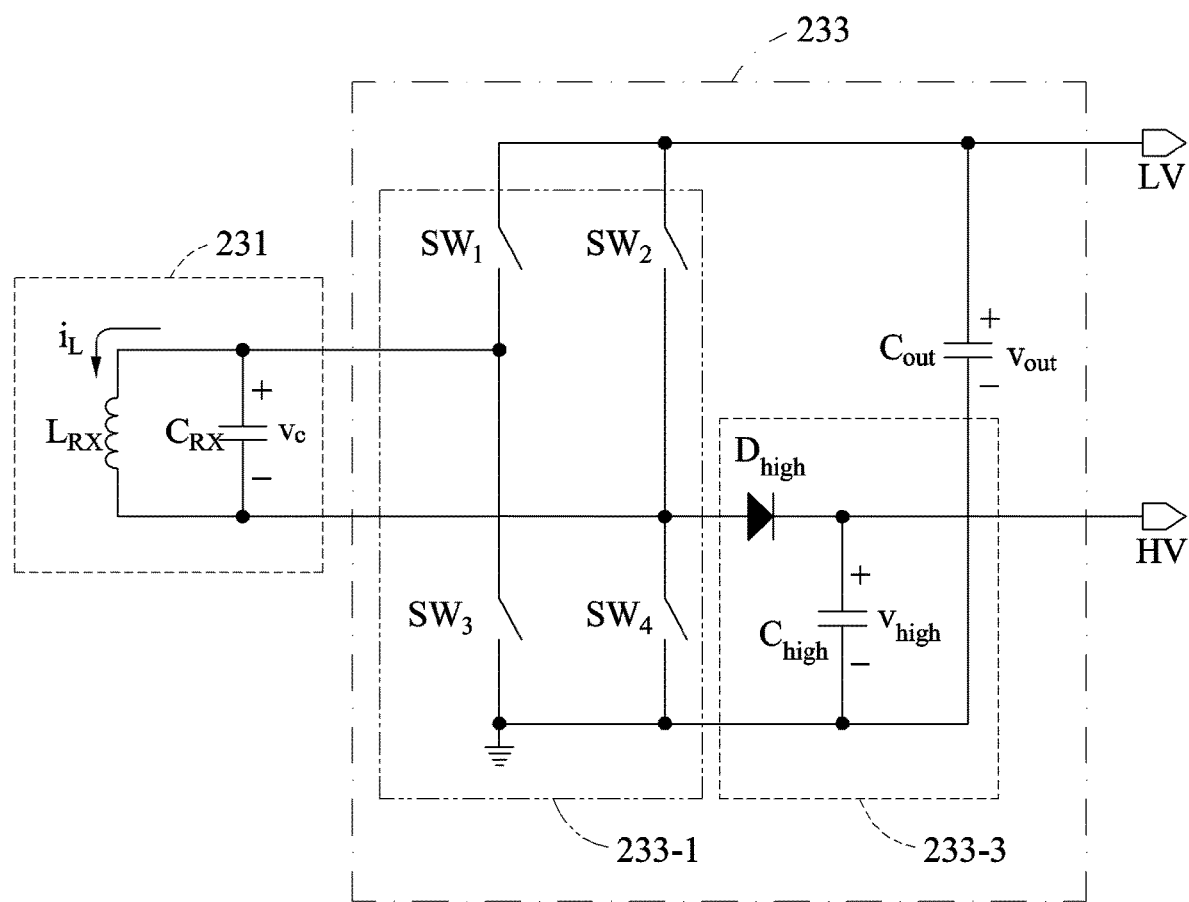
FIG. 7 is a circuit diagram illustrating an example of a power converter.
Figure 8A:
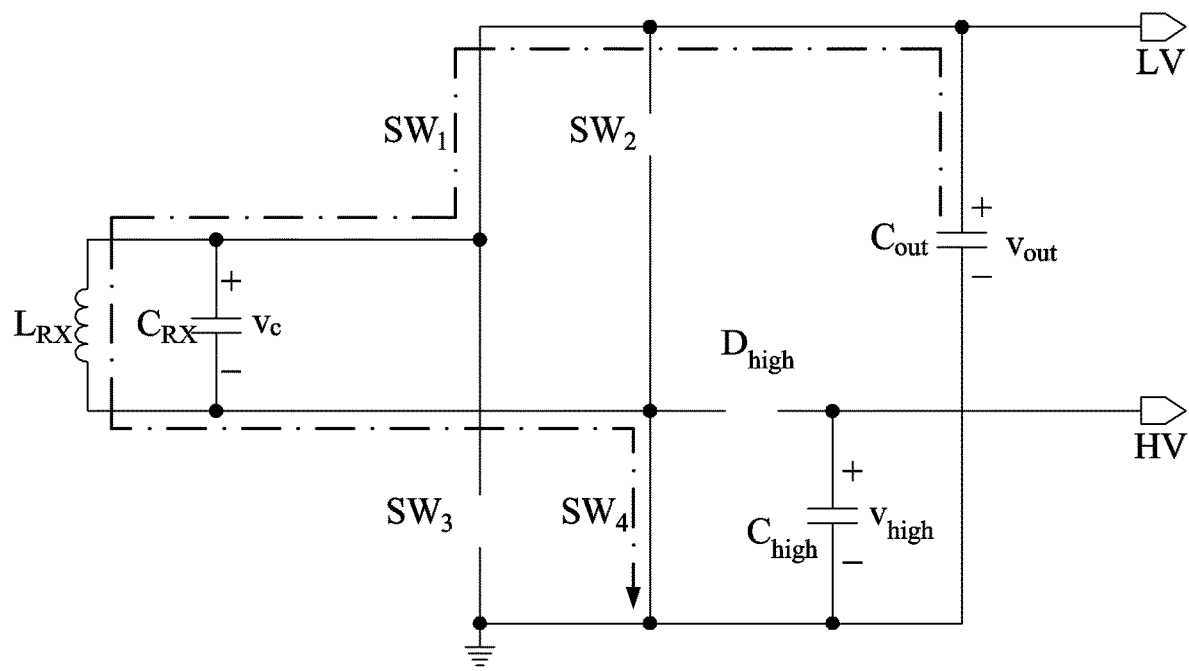
FIGS. 8A and 8B are circuit diagrams illustrating examples of operations of a switch arrangement circuit.
Figure 8B:
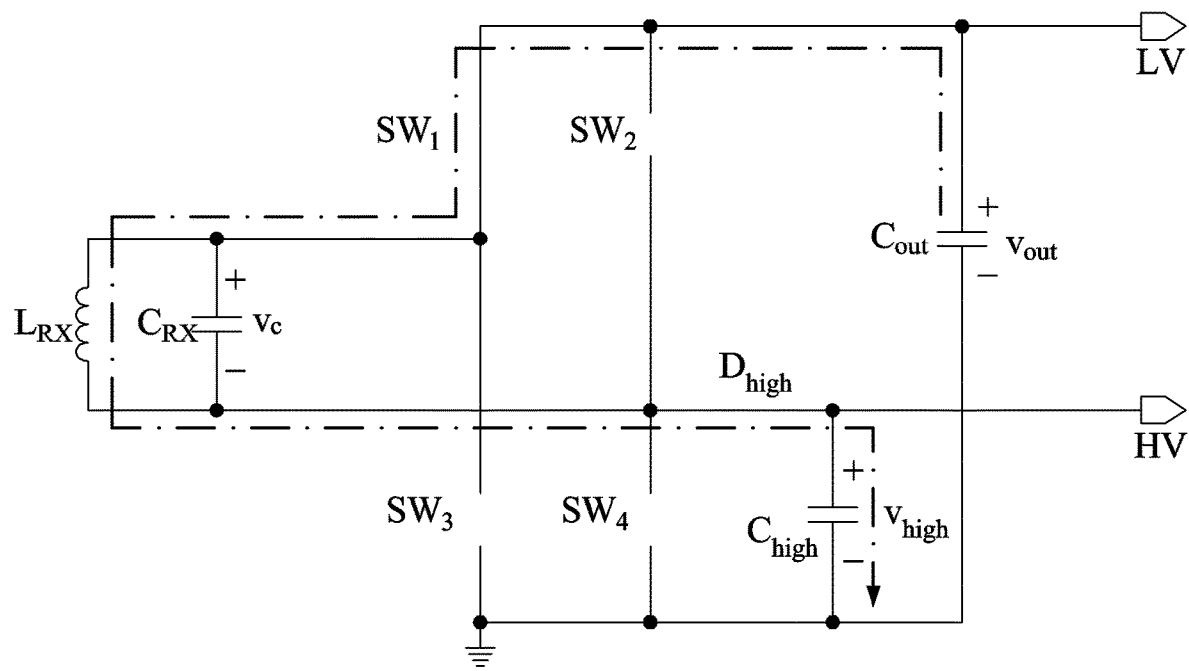

FIG. 7 is a circuit diagram illustrating an example of a power converter, such as the power converter of FIG. 2, and FIGS. 8A and 8B are circuit diagrams illustrating examples of operations of a switch arrangement circuit of FIG. 7.

Referring to FIGS. 7 through 8B, a switch arrangement circuit 233-1, such as the switch arrangement circuit 233-1 of FIG. 2, includes a plurality of switch devices $SW_1$, $SW_2$, $SW_3$, and $SW_4$. Structures and operations of the first switch device $SW_1$, the second switch device $SW_2$, and the fourth switch device $SW_4$ may each be substantially the same as the structure and the operation of the switch device SW of FIGS. 3A and 3B, noting that embodiments are not limited thereto. The third switch device $SW_3$ may be implemented as or by a diode. The third switch device $SW_3$ may also be substantially the same as the structure and operation of the switch device SW of FIGS. 3A and 3B.

For ease of description of FIG. 7, an example exists where a power converter 233, such as the power converter 233 of FIG. 2 operates in a normal operation mode, and a resonant voltage generated in the capacitor $C_{RX}$ using wireless power is rectified and stored in the capacitor $C_{out}$ in a form of DC voltage. In this example, the first switch device $SW_1$, the second switch device $SW_2$, and the fourth switch device $SW_4$ may be controlled to also act as diodes.

A switching controller 235, such as the switching controller 235 of FIG. 2, may then or alternatively control the power converter 233 to operate in a high-voltage build-up operation mode in response to a high-voltage build-up operation mode signal.

For an energy build-up operation, the switching controller 235 turns on the first switch device $SW_1$ and the fourth switch device $SW_4$, and turns off the second switch device $SW_2$. As shown in FIG. 8A, the energy stored in the capacitor $C_{out}$ in a form of voltage is transmitted to (or built up in) the inductor $L_{RX}$ in a form of current.

For an energy release operation, the switching controller 235 controls only the fourth switch device $SW_4$ to act as a diode. The switching controller 235 maintains the first switch device $SW_1$ to be turned on, and maintains the second switch device $SW_2$ to be turned off. In response to a determined preset amount of the energy stored in the capacitor $C_{out}$ being transmitted to the inductor $L_p$x, the switching controller 235 initiates the energy release operation.

Unlike FIG. 5B, the energy of the inductor $L_{RX}$ and the energy stored in the capacitor $C_{out}$ may be transmitted together to the capacitor $C_{high}$ through the diode $D_{high}$ as shown in FIG. 8B.

In response to the entire amount of the energy of the inductor $L_{RX}$ and/or the entire amount of the energy stored in the capacitor $C_{out}$ being determined to have been transmitted to the capacitor $C_{high}$, the switching controller 233 controls the first switch device $SW_1$, the second switch device $SW_2$, and the fourth switch device $SW_4$ to act as diodes for a rectification operation. The switching controller 235 controls the first switch device $SW_1$ and the second switch device $SW_2$ to act as diodes. Further, the switching controller 235 maintains the fourth switch device $SW_4$ to act as a diode.

The energy stored in the capacitor $C_{out}$ through the rectification operation is transmitted to the capacitor $C_{high}$ through the energy build-up operation and the energy release operation.

Until a voltage $v_{high}$ corresponding to the energy stored in the capacitor $C_{high}$ is determined to correspond to or reach a predetermined high voltage, the rectification operation, the energy build-up operation, and the energy release operation may be controlled to be iteratively performed.

The power converter 233 may alternatively or additionally output the high voltage $v_{high}$ generated in the capacitor $C_{high}$ as the second voltage HV in response to the switch arrangement circuit 233-1 transmitting energy stored or charged in a battery disposed in the wireless power reception device 200 to the capacitor $C_{high}$ of a boosting circuit 233-3 via the inductor $L_{RX}$, such as further described with reference to FIGS. 9 through 14D.

Figure 9:
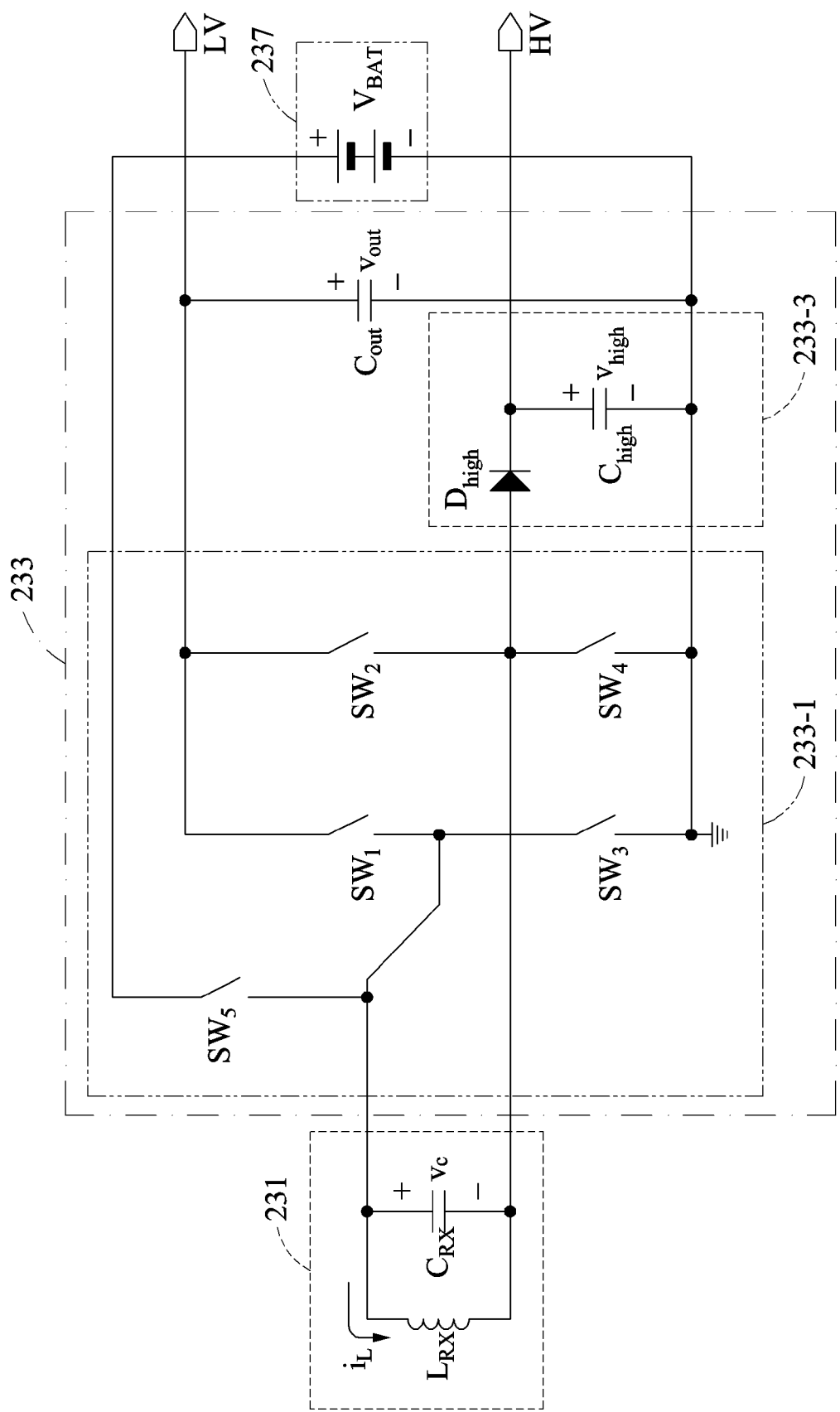
FIG. 9 is a circuit diagram illustrating an example of a power converter.
Figure 10A:
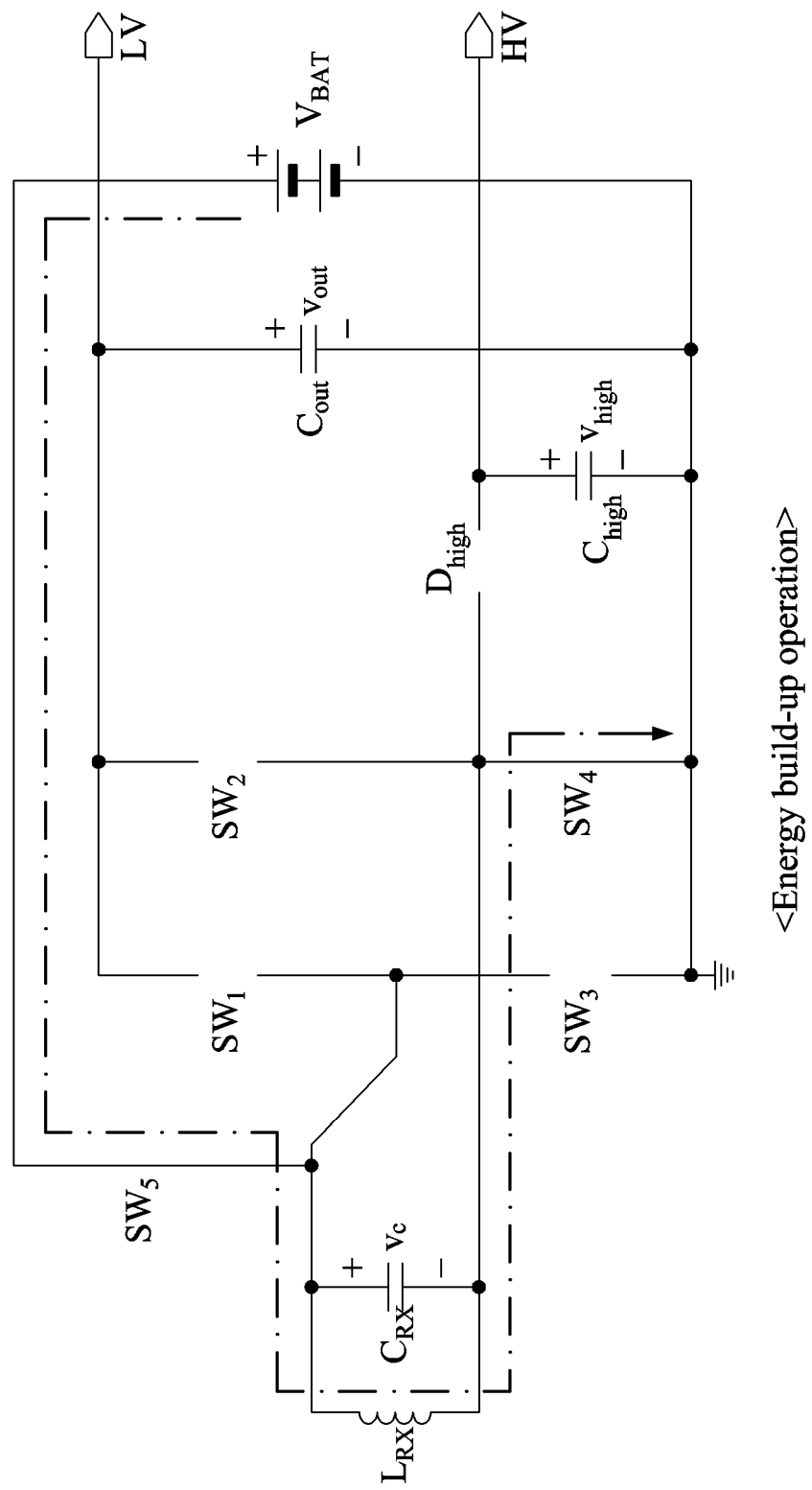
FIGS. 10A and 10B are circuit diagrams illustrating examples of operations of a switch arrangement circuit.
Figure 10B:
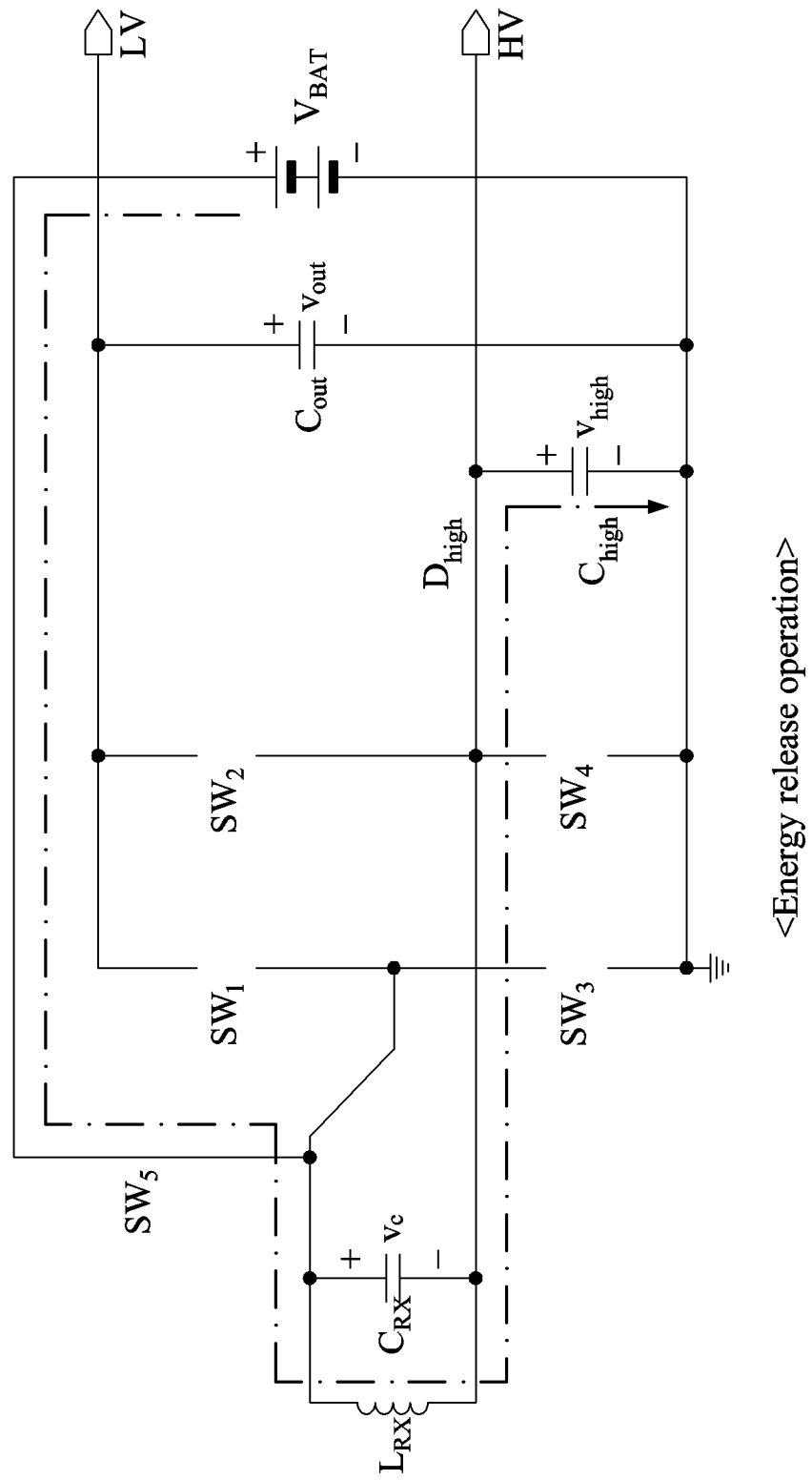

For example, FIG. 9 is a circuit diagram illustrating an example of a power converter, such as the power converter of FIG. 2, and FIGS. 10A and 10B are circuit diagrams illustrating examples of operations of a switch arrangement circuit of FIG. 9.

Referring to FIGS. 9 through 10B, a switch arrangement circuit 233-1, such as the switch arrangement circuit 233-1 of FIG. 2, includes a plurality of switch devices $SW_1$, $SW_2$, $SW_3$, $SW_4$, and $SW_5$. Structures and operations of each of the first switch device $SW_1$, the second switch device $SW_2$, the fourth switch device $SW_4$, and the fifth switch device $SW_5$ may be substantially the same as the structure and the operation of the switch device SW of FIGS. 3A and 3B, nothing that embodiments are not limited thereto. The third switch device $SW_3$ may be implemented as or by a diode. The third switch device $SW_3$ may also be substantially the same as the structure and operation of the switch device SW of FIGS. 3A and 3B.

For ease of description of FIG. 9, an example exists where a power converter 233, such as the power converter 233 of FIG. 2, operates in a normal operation mode, and a resonant voltage generated in the capacitor $C_{RX}$ using wireless power is rectified and stored in the capacitor $C_{out}$ in a form of DC voltage. In this example, the first switch device $SW_1$, the second switch device $SW_2$, and the fourth switch device $SW_4$ may be controlled to act as diodes, and the fifth switch device $SW_5$ may be controlled to be be turned off.

A switching controller 235, such as the switching controller 235 of FIG. 2, controls the power converter 233 to operate in a high-voltage build-up operation mode in response to a high-voltage build-up operation mode signal.

For an energy build-up operation, the switching controller 235 turns off the first switch device $SW_1$ and the second switch device $SW_2$, and turns on the fourth switch device $SW_4$ and the fifth switch device $SW_5$. Thus, as shown in FIG. 10A, the energy stored in the battery 237 is transmitted to (or built up in) the inductor $L_{RX}$ in a form of current.

For an energy release operation, while the third switch device $SW_3$ is implemented as a diode, of the remaining switch devices the switching controller 235 controls only the fourth switch device $SW_4$ to act as a diode. The switching controller 235 maintains the first switch device $SW_1$ and the second switch device $SW_2$ to be turned off, and maintains the fifth switch device $SW_5$ to be turned on. In response to a determined preset amount of the energy stored in the battery 237 being transmitted to the inductor $L_{RX}$, the switching controller 235 initiates the energy release operation. Thus, as shown in FIG. 10B, the energy of the inductor $L_{RX}$ and the energy stored in the battery 237 are transmitted to the capacitor $C_{high}$ through the diode $D_{high}$.

In this example, a boost converter is configured using the battery 237, the inductor $L_{RX}$, the fourth switch device $SW_4$, the diode $D_{high}$, and the capacitor $C_{high}$ in a high-voltage build-up operation mode.

Until a voltage $v_{high}$ corresponding to the energy stored in the capacitor $C_{high}$ is determined to correspond to or reach a predetermined high voltage, the energy build-up operation and the energy release operation may be controlled to be iteratively performed.

Figure 11:
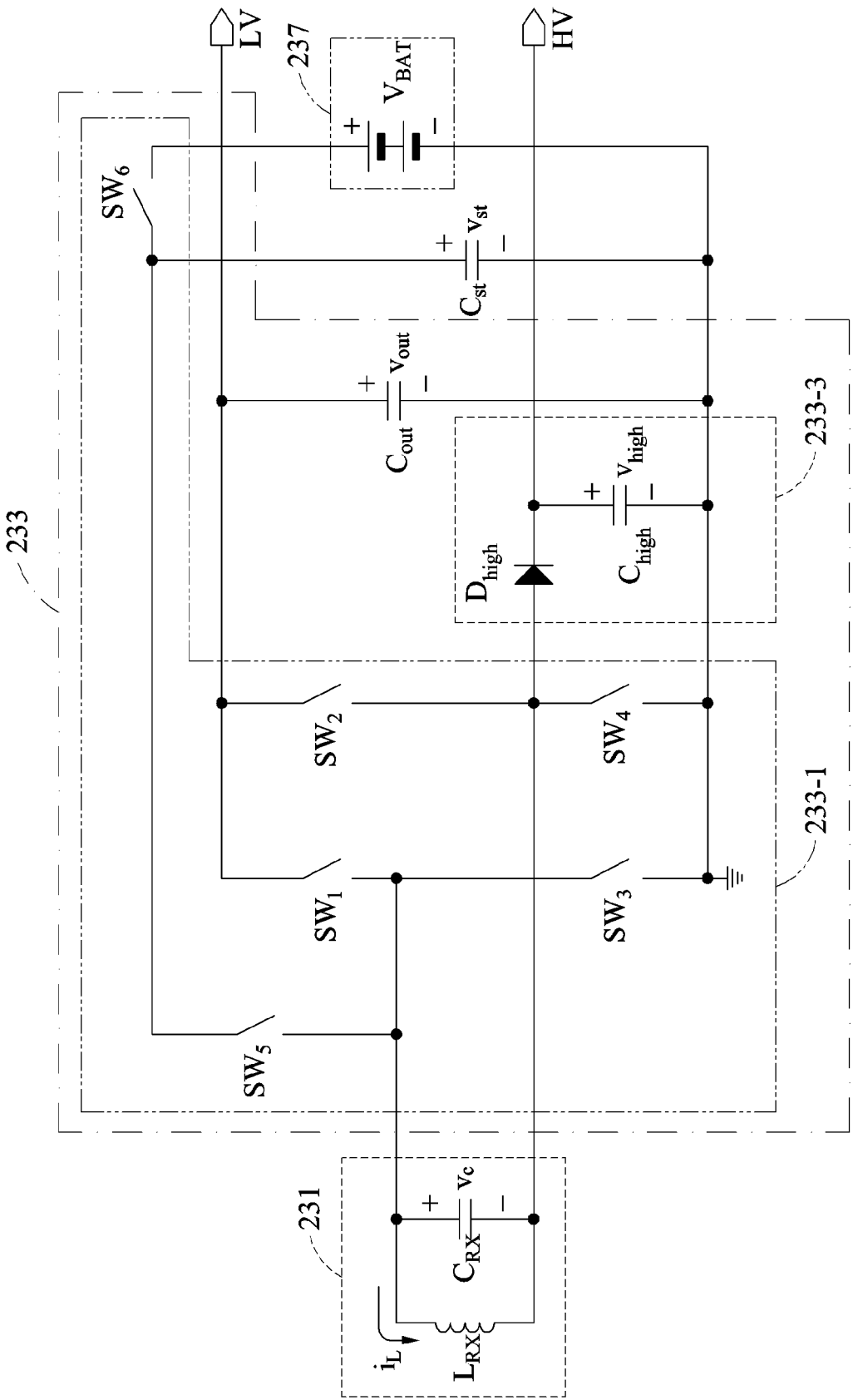
FIG. 11 is a circuit diagram illustrating an example of a power converter.

FIG. 11 is a circuit diagram illustrating an example of a power converter, such as the power converter of FIG. 2, and FIGS. 12A through 12D are circuit diagrams illustrating examples of operations of a switch arrangement circuit of FIG. 11.

Figure 12A:
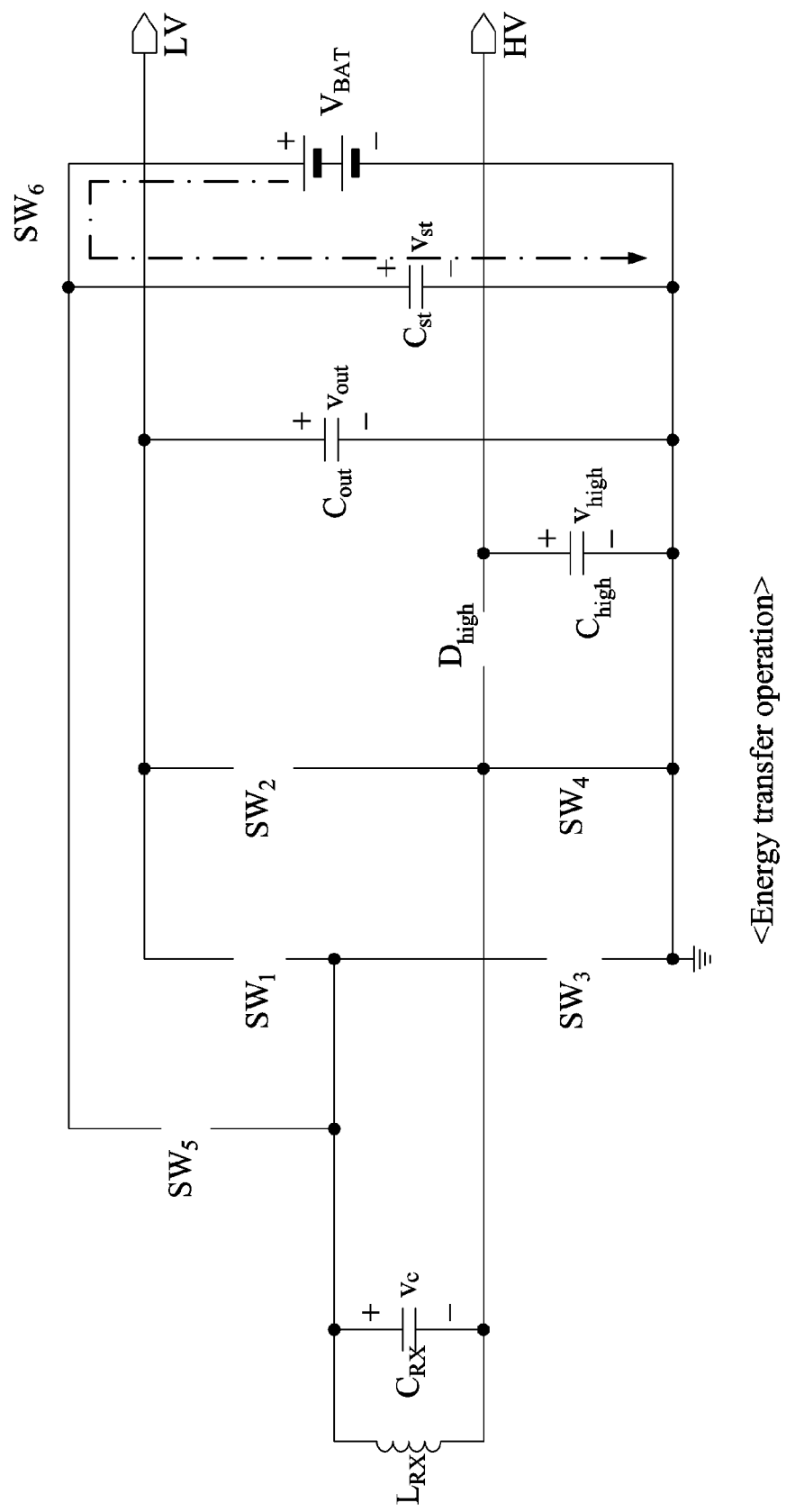
FIGS. 12A, 12B, 12C, and 12D are circuit diagrams illustrating examples of operations of a switch arrangement circuit.
Figure 12B:
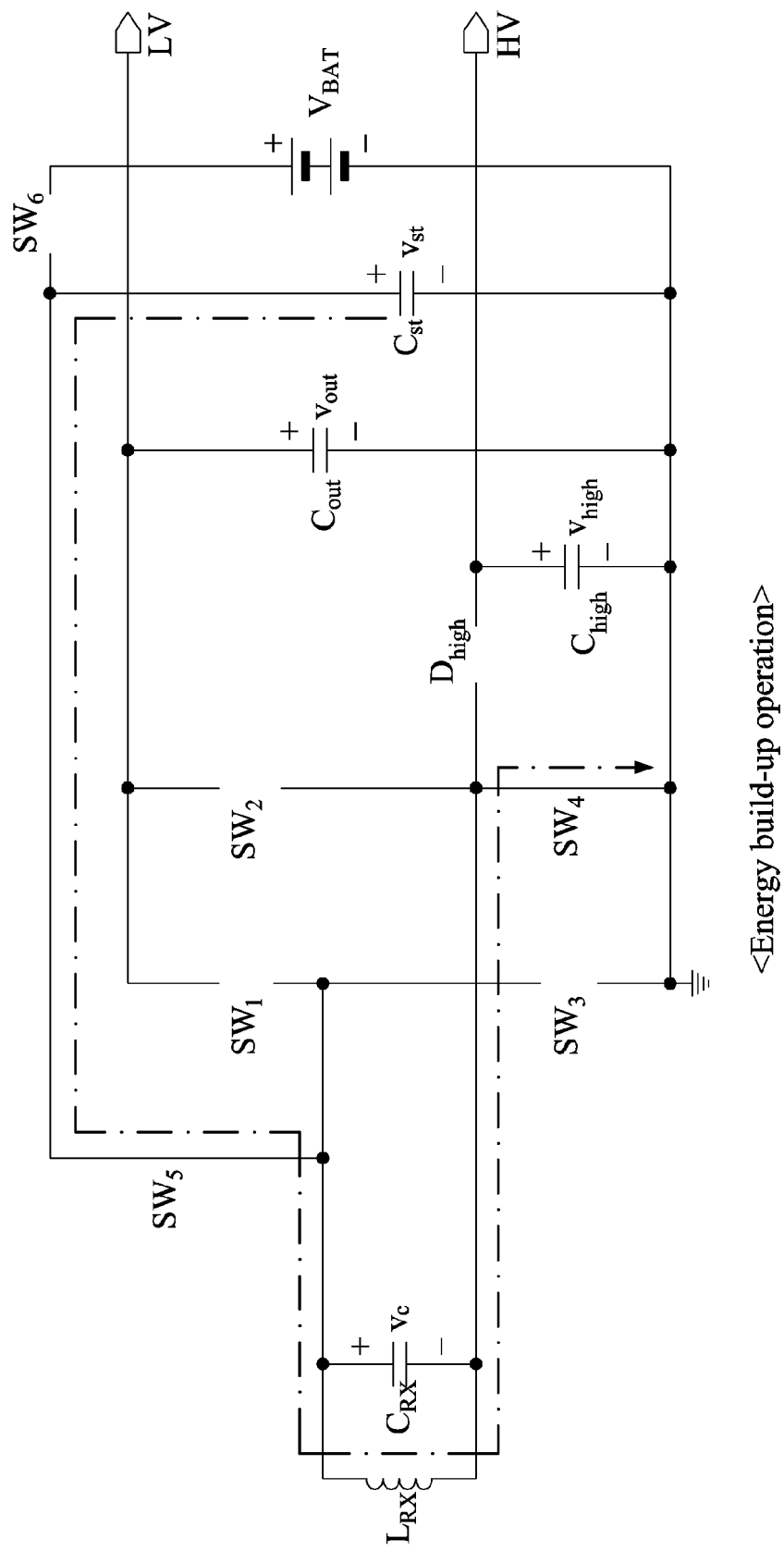
Figure 12C:
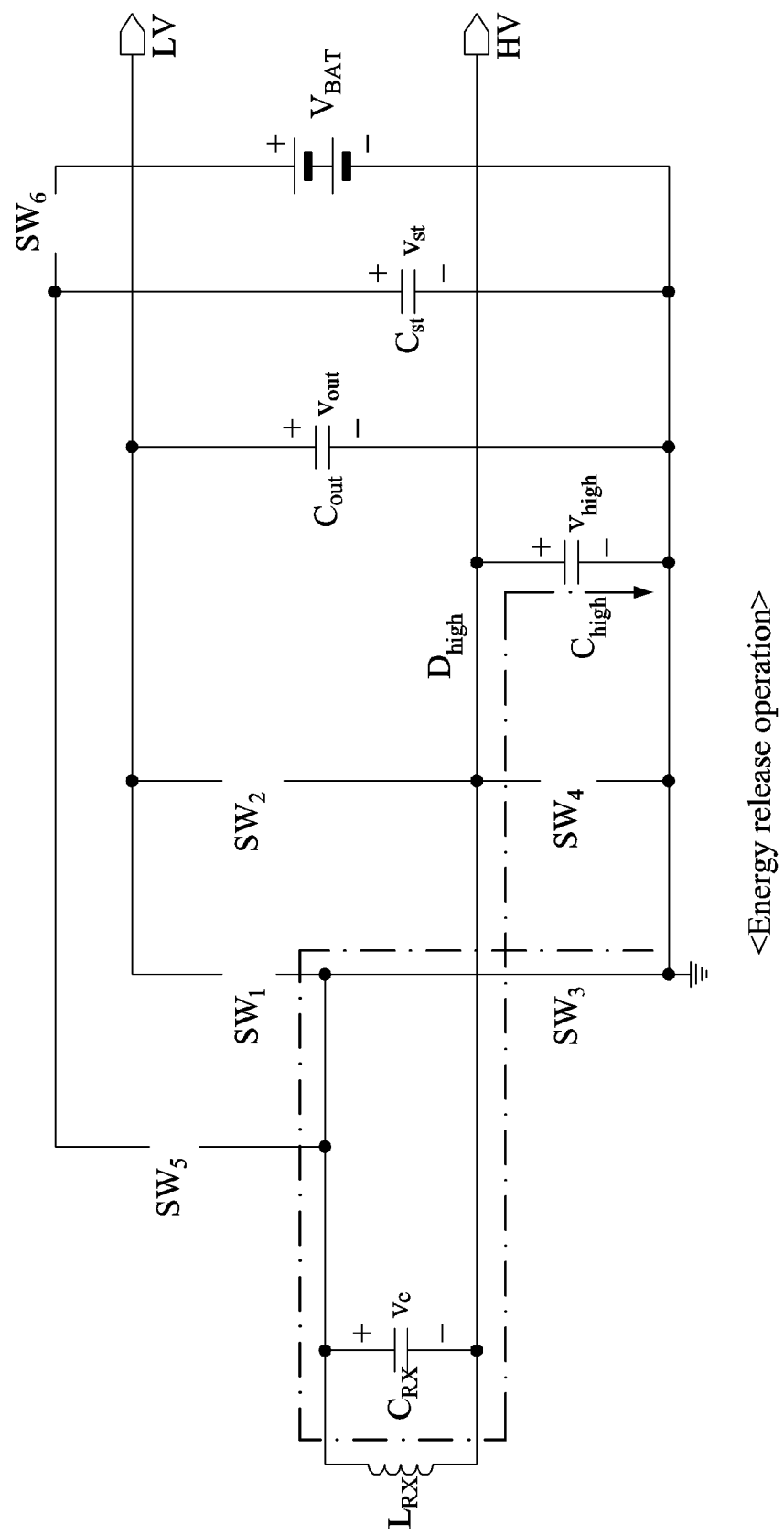
Figure 12D:
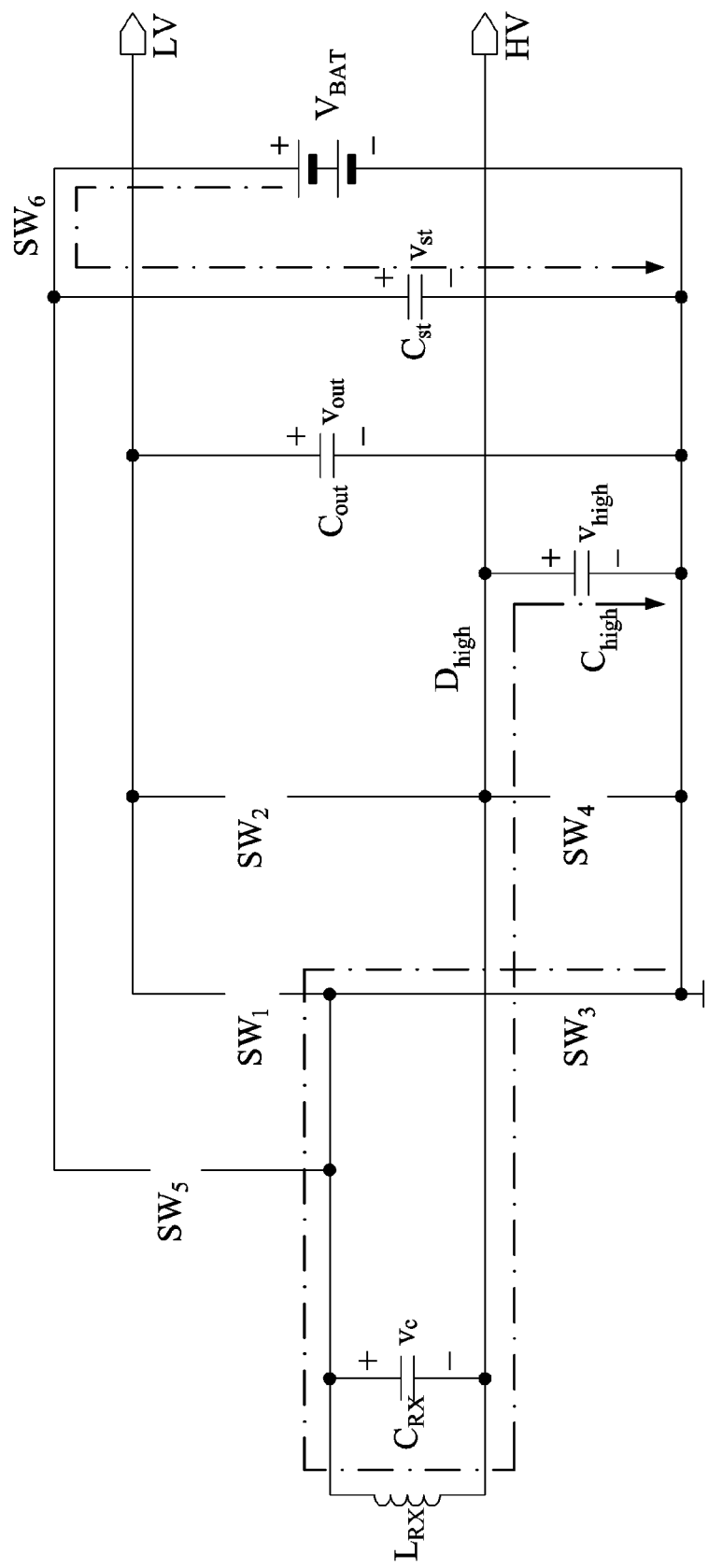

Referring to FIGS. 11 through 12D, a switch arrangement circuit 233-1, such as the switch arrangement circuit 233-1 of FIG. 2, includes a plurality of switch devices $SW_1$, $SW_2$, $SW_3$, $SW_4$, $SW_5$, and $SW_6$. Structures and operations of each of the plurality of switch devices $SW_1$ through $SW_6$ may be substantially the same as the structure and the operation of the switch device SW of FIGS. 3A and 3B, noting that embodiments are not limited thereto.

For ease of description of FIG. 11, an example exists where a power converter 233, such as the power converter 233 of FIG. 2, operates in a normal operation mode and a resonant voltage generated in the capacitor $C_{RX}$ using wireless power is rectified and stored in the capacitor $C_{out}$ in a form of DC voltage. In this example, the first switch device $SW_1$, the second switch device $SW_2$, the third switch device $SW_3$, and the fourth switch device $SW_4$ are controlled to act as diodes, and the fifth switch device $SW_5$ and the sixth switch device $SW_6$ controlled to be turned off.

In this example, the wireless power reception device 200 further includes a capacitor $C_{st}$ configured to store energy of the battery 237.

For an energy transfer operation, a switching controller 235, such as the switching controller 235 of FIG. 2, turns off the first switch device $SW_1$, the second switch device $SW_2$, and the fifth switch device $SW_5$, and turns on the fourth switch device $SW_4$ and the sixth switch device $SW_6$. Further, the switching controller 235 maintains the third switch device $SW_3$ to be controlled to act as a diode. Thus, as shown in FIG. 12A, the energy stored in the battery 237 is transmitted and stored in the capacitor $C_{st}$.

For an energy build-up operation, the switching controller 235 turns on the fifth switch device $SW_5$, and turns off the sixth switch device $SW_6$. Further, the switching controller 235 maintains the first switch device $SW_1$ and the second switch device $SW_2$ to be turned off, maintains the fourth switch device $SW_4$ to be turned on, and maintains the third switch device $SW_3$ to be controlled to act as a diode. Thus, as shown in FIG. 12B, the energy stored in the capacitor $C_{st}$ is transmitted to (or built up in) the inductor $L_{RX}$ in a form of current.

For an energy release operation, the switching controller 235 turns off the fifth switch device $SW_5$, and controls the fourth switch device $SW_4$ to act as a diode. Further, the switching controller 235 maintains the first switch device $SW_1$, the second switch device $SW_2$, and the sixth switch device $SW_6$ to be turned off, and maintains the third switch device $SW_3$ to be controlled to act as a diode. In response to a determined preset amount of the energy stored in the capacitor $C_{st}$ being transmitted to the inductor $L_{RX}$, the switching controller 235 initiates the energy release operation. Thus, as shown in FIG. 12C, the energy of the inductor $L_{RX}$ is transmitted to the capacitor $C_{high}$ through the third switch device $SW_3$ and the diode $D_{high}$.

During the energy release operation, the switching controller 235 may control all of the switch devices $SW_1$ through $SW_6$ to perform an energy transfer operation as well. For example, as shown in FIG. 12D, the switching controller 235 may additionally turn on the sixth switch device $SW_6$, whereby the energy stored in the battery 237 is transmitted and stored in the capacitor $C_{st}$ in response to the energy of the inductor $L_{RX}$ being transmitted to the capacitor $C_{high}$ through the third switch device $SW_3$ and the diode $D_{high}$.

Until a voltage $v_{high}$ corresponding to the energy stored in the capacitor $C_{high}$ is determined to correspond to (or reach) a predetermined high voltage, the energy transfer operation, the energy build-up operation, and the energy release operation may be controlled to be iteratively performed.

Figure 13:
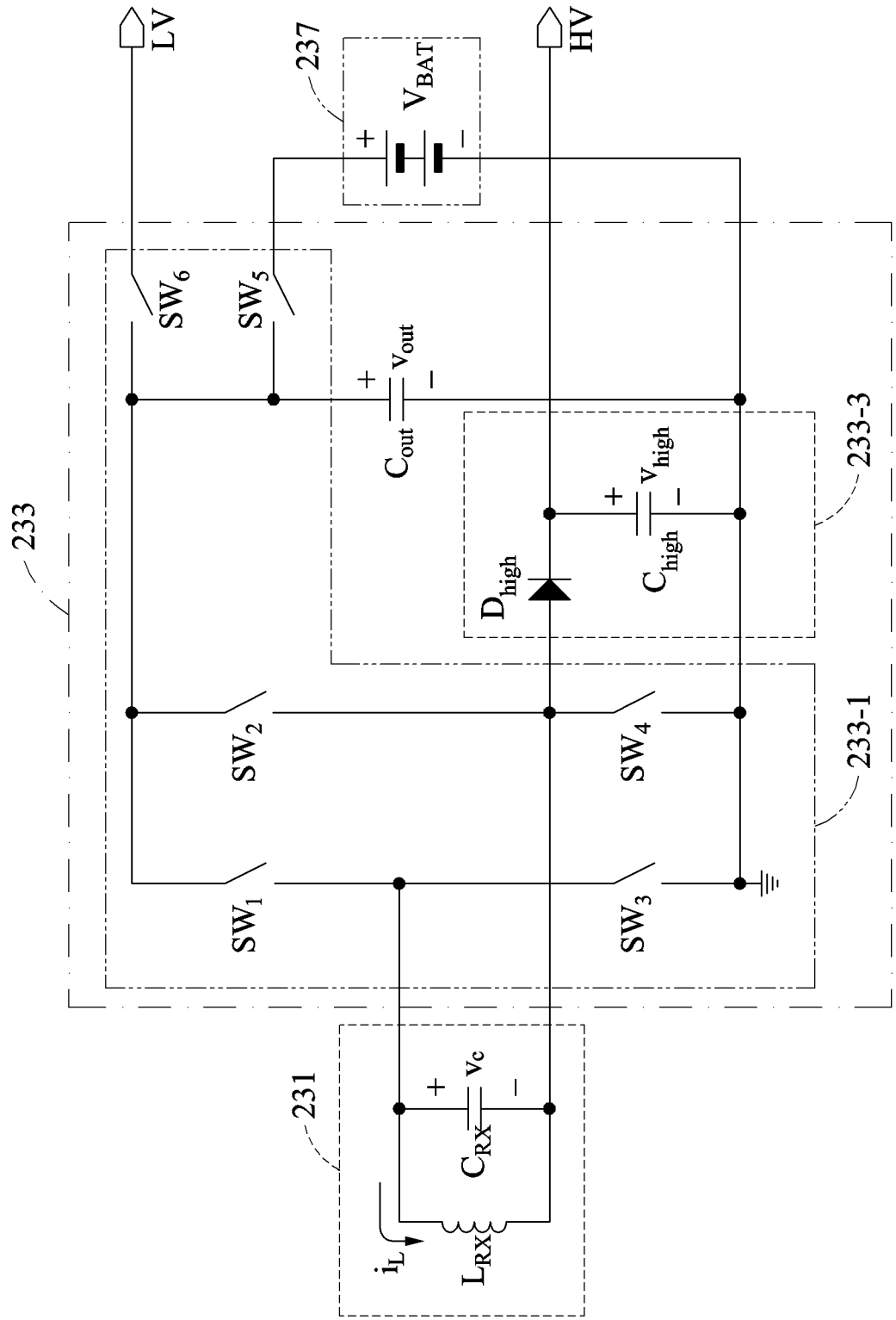
FIG. 13 is a circuit diagram illustrating an example of the power converter.

FIG. 13 is a circuit diagram illustrating an example of a power converter, such as the power converter of FIG. 2, and FIGS. 14A through 14D are circuit diagrams illustrating examples of operations of a switch arrangement circuit of FIG. 13.

Figure 14A:
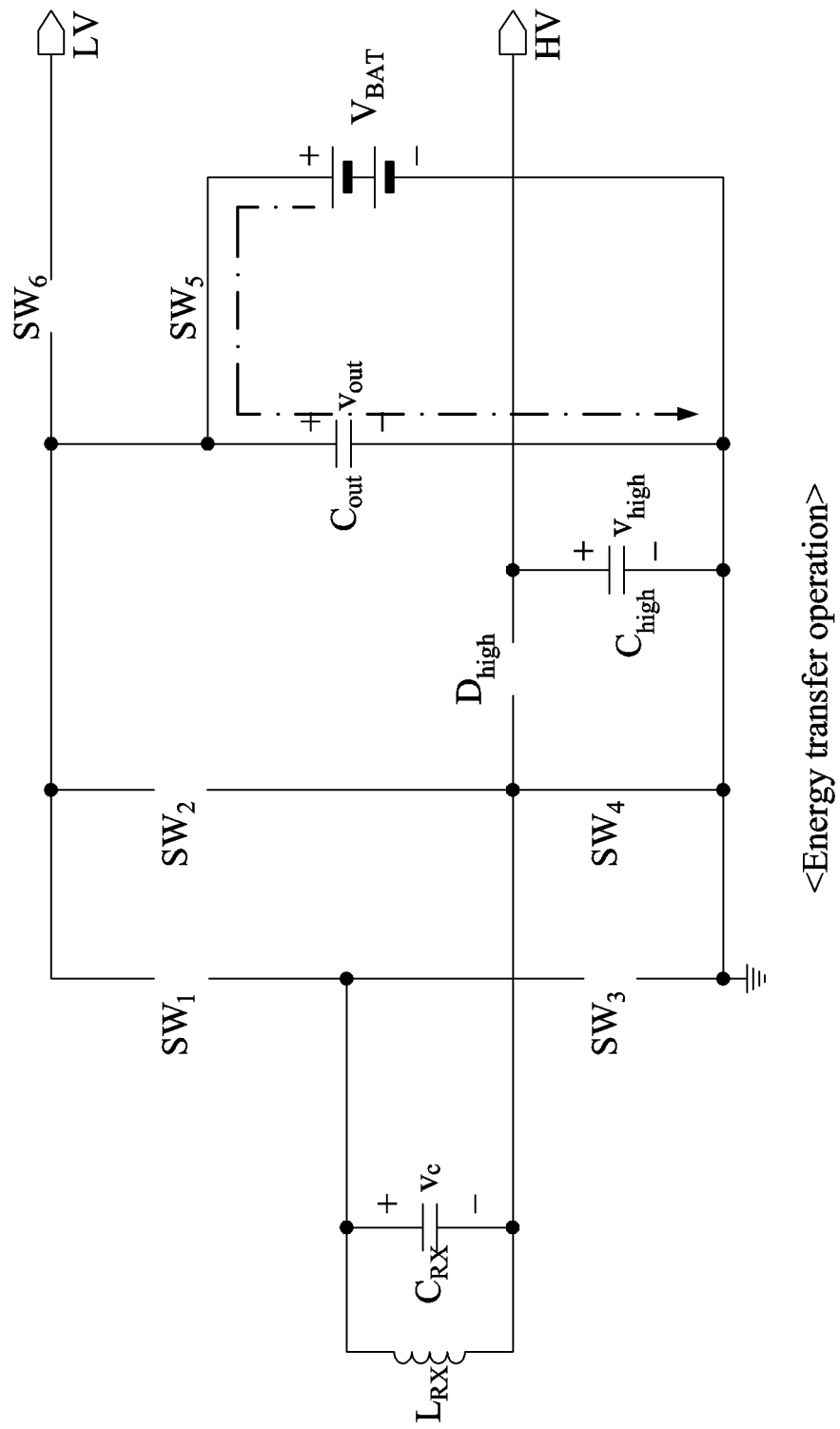
FIGS. 14A, 14B, 14C, and 14D are circuit diagrams illustrating examples of operations of a switch arrangement circuit.
Figure 14B:
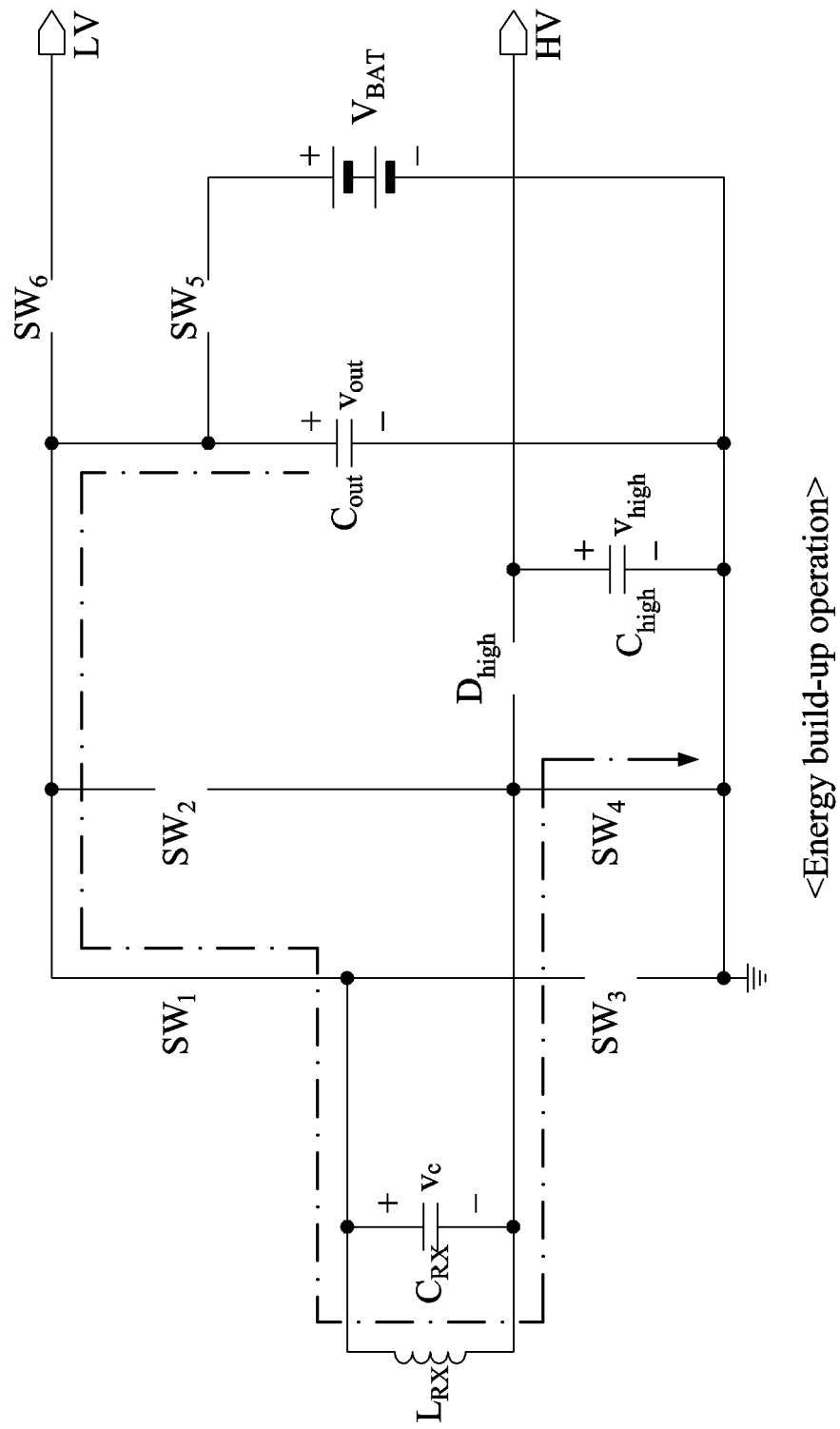
Figure 14C:
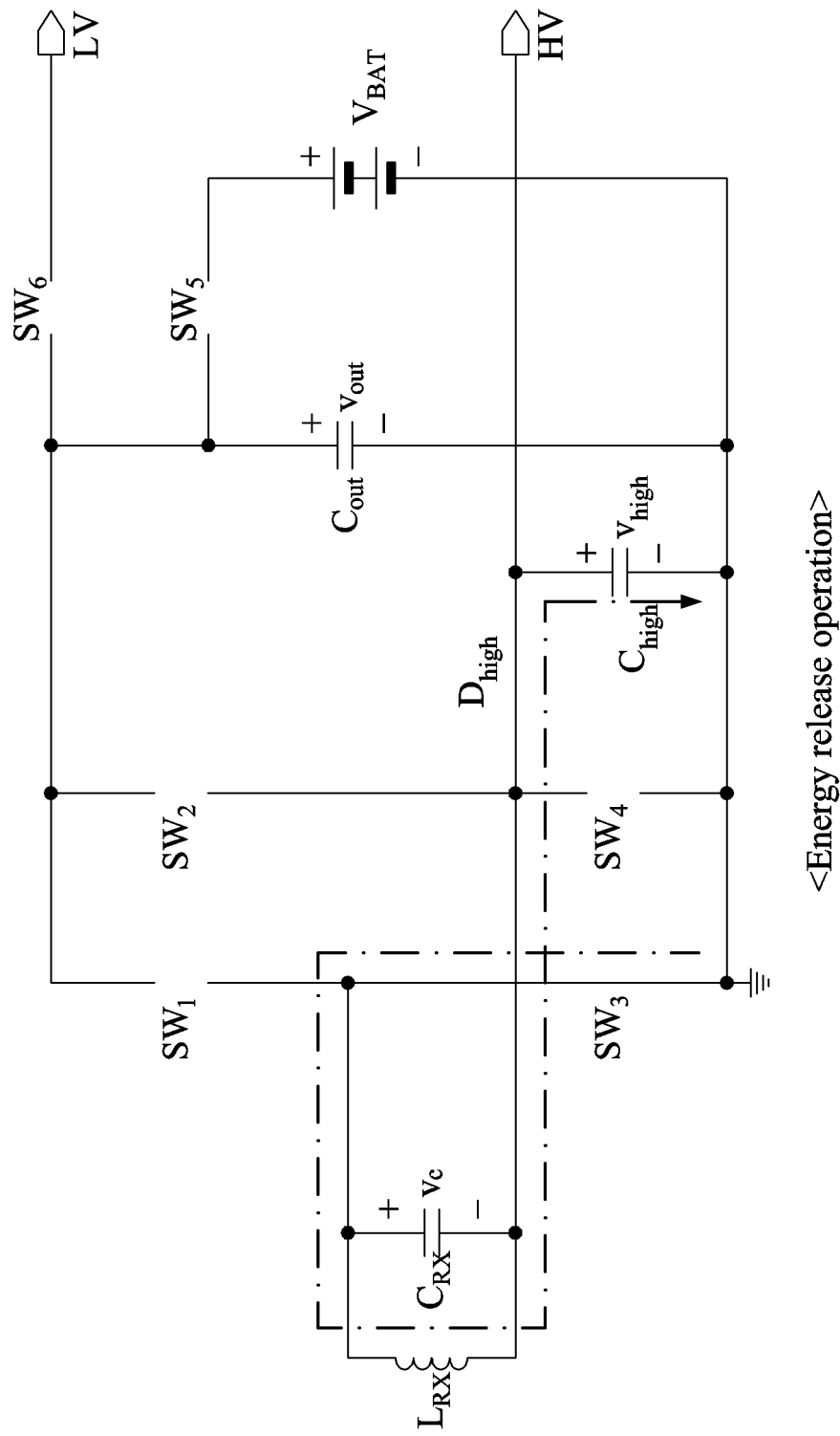
Figure 14D:
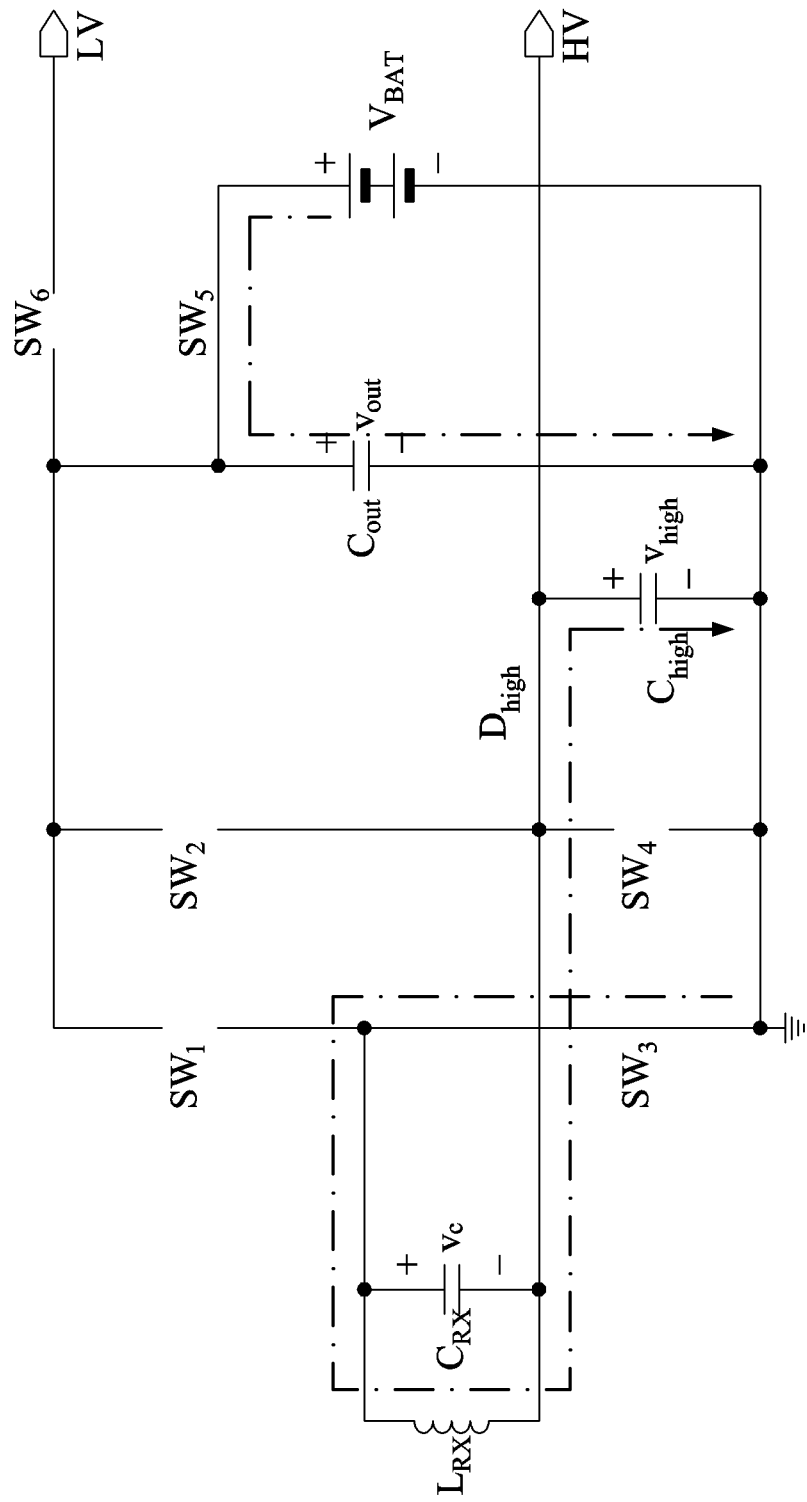

Referring to FIGS. 13 through 14D, a switch arrangement circuit 233-1, such as the switch arrangement circuit 233-1 of FIG. 2, includes a plurality of switch devices $SW_1$, $SW_2$, $SW_3$, $SW_4$, $SW_5$, and $SW_6$. Structures and operations of each of the plurality of switch devices $SW_1$ through $SW_6$ may be substantially the same as the structure and the operation of the switch device SW of FIGS. 3A and 3B, noting that embodiments are not limited thereto.

For an energy transfer operation, a switching controller 235, such as the switching controller 235 of FIG. 2, turns off the first switch device $SW_1$, the second switch device $SW_2$, and the sixth switch device $SW_6$, and turns on the fourth switch device $SW_4$ and the fifth switch device $SW_5$. Further, the switching controller 235 controls the third switch device $SW_3$ to act as a diode.

As shown in FIG. 14A, the energy stored in the battery 237 is transmitted and stored in the capacitor $C_{out}$. In this example, a resonant voltage generated in the capacitor $C_{RX}$ using wireless power is rectified and stored in the capacitor $C_{out}$ in a form of DC voltage. Although a voltage $v_{out}$ of the capacitor $C_{out}$ increases to a voltage VBAT of the battery 237, back or subsequent circuits connected to the sixth switch device $SW_6$ are protected by the sixth switch device $SW_6$, e.g., back or subsequent circuits of the power receiver that use or require the low or normal voltage $v_{out}$ provided to such back or subsequent circuits during the low or normal mode operations.

For an energy build-up operation, the switching controller 235 turns on the first switch device $SW_1$, and turns off the fifth switch device $SW_5$. Further, the switching controller 235 maintains the second switch device $SW_2$ and the sixth switch device $SW_6$ to be turned off, maintains the third switch device $SW_3$ to be controlled to act as a diode, and maintains the fourth switch device $SW_4$ to be turned on. Thus, as shown in FIG. 14B, the energy stored in the capacitor $C_{out}$ is transmitted to (or built up in) the inductor $L_{RX}$ in a form of current.

For an energy release operation, the switching controller 235 turns off the first switch device $SW_1$, and controls the fourth switch device $SW_4$ to act as a diode. Further, the switching controller 235 maintains the second switch device $SW_2$, the fifth switch device $SW_5$, and the sixth switch device $SW_6$ to be turned off, and maintains the third switch device $SW_3$ to be controlled to act as a diode. In response to a determined preset amount of the energy stored or charged in the capacitor $C_{out}$ being transmitted to the inductor $L_{RX}$, the switching controller 235 initiates the energy release operation. Thus, as shown in FIG. 14C, the energy of the inductor $L_{RX}$ is transmitted to the capacitor $C_{high}$ through the third switch device $SW_3$ and the diode $D_{high}$.

During the energy release operation, the switching controller 235 controls the switch devices $SW_1$ through $SW_6$ to perform an energy transfer operation as well. As shown in FIG. 14D, the switching controller 235 additionally turns on the fifth switch device $SW_5$, whereby the energy stored in the battery 237 is transmitted and stored in the capacitor $C_{out}$ in response to the energy of the inductor $L_{RX}$ being transmitted to the capacitor $C_{high}$ through the third switch device $SW_3$ and the diode $D_{high}$.

Until a voltage $v_{high}$ corresponding to the energy stored in the capacitor $C_{high}$ is determined to correspond to (or reach) a predetermined or preset high voltage, the energy transfer operation, the energy build-up operation, and the energy release operation may be iteratively performed.

Figure 16:
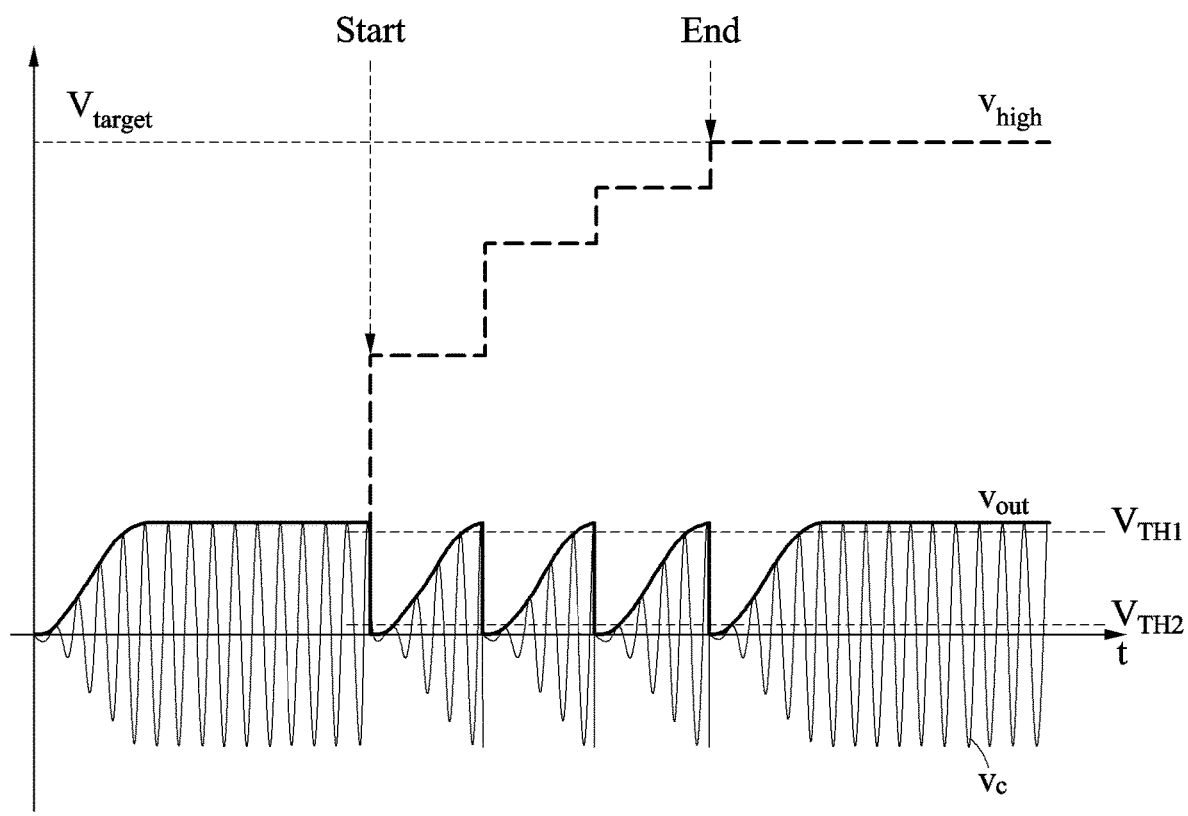
FIG. 16 is a graph illustrating an example of a relationship among energies generated and transmitted based on operations of a power converter.

FIG. 15 is a flowchart illustrating an example of an operation of a power converter, such as the power converter 233 of FIG. 4, and FIG. 16 is a graph illustrating an example of a relationship among energies generated and transmitted based on operations of the power converter of FIG. 15.

For ease of description of FIG. 15, an example exists where the power converter selectively operates in a normal operation mode, with a resonant voltage generated in the capacitor $C_{RX}$ using wireless power being rectified and stored in the capacitor $C_{out}$ in a form of DC voltage. For example, with the example of FIG. 4, the switch devices $SW_1$ through $SW_4$ would be acting as diodes.

Referring to FIGS. 15 and 16, in operation 1510, the power converter enters a high-voltage build-up operation mode under control of a switching controller, e.g., the power converter changes to the high-voltage build-up operation mode from the normal operation mode under control of the switching controller 235 of FIG. 4. The power converter operates in the high-voltage build-up operation mode until a voltage $v_{high}$ generated in a capacitor $C_{high}$ is determined to correspond to a predetermined high voltage.

In operation 1520, the switching controller compares a voltage $v_{out}$ of a capacitor $C_{out}$, such as the capacitor $C_{out}$ of FIG. 4, to a first threshold $V_{TH1}$.

In response to the voltage $v_{out}$ being less than the first threshold $V_{TH1}$, a switch arrangement circuit, such as the switch arrangement circuit 233-1 of FIG. 4, performs a rectification operation, in operation 1530. For example, with the example of FIG. 4, the switch devices $SW_1$ through $SW_4$ may be controlled to continuously act as diodes.

In response to the voltage $v_{out}$ being greater than or equal to the first threshold $V_{TH1}$, the switch arrangement circuit performs an energy build-up operation, in operation 1540. In this example, the first switch device $SW_1$ and the fourth switch device $SW_4$ are turned on, and the second switch device $SW_2$ is turned off. Further, the third switch device $SW_3$ is maintained to act as a diode.

During the energy build-up operation, the switching controller compares the voltage $v_{out}$ of the capacitor $C_{out}$ to a second threshold $V_{TH2}$, in operation 1550.

In response to the voltage $v_{out}$ being greater than the second threshold $V_{TH2}$, the switch arrangement circuit continues to perform the energy build-up operation, in operation 1540. Thus, until the voltage $v_{out}$ is less than or equal to the second threshold $V_{TH2}$, energy stored in the capacitor $C_{out}$ is transmitted to an inductor $L_{RX}$.

In response to the voltage $v_{out}$ being less than or equal to the second threshold $V_{TH2}$, the switch arrangement circuit performs an energy release operation, in operation 1560. In this example, the first switch device $SW_1$ is turned off, and the fourth switch device $SW_4$ acts as a diode. Further, the second switch device $SW_2$ is maintained to be turned off, and the third switch device $SW_3$ is maintained to act as a diode. For example, the energy release operation may be performed for a predetermined (and/or alternatively desired) period of time. The period of time may be set to be a predetermined sufficient period of time to transmit the entire amount of energy of the inductor $L_{RX}$ to the capacitor $C_{high}$.

In operation 1570, the switching controller compares the voltage $v_{high}$ of the capacitor $C_{high}$ to a target value $V_{target}$.

In response to the voltage $v_{high}$ being less than the target value $V_{target}$, the switch arrangement circuit performs the rectification operation, in operation 1580. In this example, the first switch device $SW_1$ and the second switch device $SW_2$ act as diodes. Further, the third switch device $SW_3$ and the fourth switch device $SW_4$ are maintained to act as diodes.

Until the voltage $v_{high}$ reaches the target value $V_{target}$, operations 1520 through 1580 are repeated.

In response to the voltage $v_{high}$ being greater than or equal to the target value $V_{target}$, the power converter enters a normal operation mode, in operation 1590. In this example, the voltage $v_{high}$ generated in the high-voltage build-up operation mode is output as a second voltage HV.

For ease of description, only the operation of the power converter of FIG. 4 is described above with reference to FIGS. 15 and 16. However, the respective power converters shown in FIGS. 7, 9, 11, and 13 may operate in the same (or similar) manner as described above with FIGS. 15 and 16, noting that embodiments are not limited thereto.

The wireless power system 10, wireless power transmission devices 100, controller 110, power transmitter 130, communicator 150, wireless power reception device 200, controller 210, power receiver 230, resonator 231, power converter 233, switch arrangement circuit 233-1, boosting circuit 233-3, switching controller 235, communicator 250, SW, $SW_1$, $SW_2$, $SW_3$, $SW_4$, $SW_5$, and $SW_6$, respectively illustrated in FIGS. 1-3A, 4-5B, and 7-14D that perform the operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only and further to the above, a power reception device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power device comprising:
a boosting circuit configured to generate a high voltage;
a switch arrangement circuit configured to selectively transmit energy to the boosting circuit, for the generating of the high voltage, using an inductor included in a resonator and in response to a build-up request for the high voltage, and rectify resonant voltage generated in a first capacitor included in the resonator; and
a second capacitor configured to store the rectified voltage, which is rectified by the switch arrangement circuit,
wherein the boosting circuit comprises:
a diode configured to transmit energy transmitted from the switch arrangement circuit; and
a third capacitor configured to store the transmitted energy by the diode.

2. The wireless power device of claim 1, wherein the switch arrangement circuit is configured to iteratively transmit the energy for the generating of the high voltage to the boosting circuit until a voltage stored in the boosting circuit reaches the high voltage.

3. The wireless power device of claim 1, further comprising:
a first capacitor configured to store a resonant voltage generated by a resonance of the resonator,
wherein the energy selectively transmitted to the boosting circuit includes at least one of energy corresponding to the resonant voltage stored in the first capacitor or energy charged in a battery.

4. The wireless power device of claim 3, wherein the switch arrangement circuit is configured to transmit the energy charged in the battery to the boosting circuit using the inductor and to transmit, to the boosting circuit, energy stored by at least one of the first capacitor or the second capacitor configured to store the energy charged in the battery.

5. The wireless power device of claim 1, further comprising the resonator configured to resonate to generate a resonant voltage in response to receipt of wireless power by the inductor, and configured to build energy, in the inductor, provided by the switch arrangement circuit during the use of the inductor for the selective transmitting of energy to the boosting circuit.

6. A wireless power device comprising:
a resonator configured to resonate to generate a resonant voltage through a wireless power receiving inductor of the resonator; and
a power converter configured to generate a high voltage from a low voltage by building energy in the inductor in response to a build-up request for outputting the high voltage,
wherein the power converter comprises:

a boosting circuit configured to generate the high voltage;
a switch arrangement circuit configured to selectively transmit energy to the boosting circuit, for the generating of the high voltage, using the inductor built energy, and rectify resonant voltage generated in a first capacitor included in the resonator; and
a second capacitor configured to store the rectified voltage, which is rectified by the switch arrangement circuit,
wherein the boosting circuit comprises:
a diode configured to transmit energy transmitted from the switch arrangement circuit; and
a third capacitor configured to store the transmitted energy by the diode.

7. The wireless power device of claim 6, wherein the switch arrangement circuit is configured to iteratively transmit the energy to the boosting circuit until a voltage stored in the boosting circuit reaches the high voltage.

8. The wireless power device of claim 6, wherein the power converter further comprises:
a first capacitor configured to store the resonant voltage, wherein the energy selectively transmitted to the boosting circuit includes at least one of energy corresponding to the resonant voltage stored in the first capacitor or energy charged in a battery.

9. The wireless power device of claim 8, wherein the switch arrangement circuit is configured to transmit the energy charged in the battery to the boosting circuit using the inductor and to transmit, to the boosting circuit, energy stored by at least one of the first capacitor or the second capacitor configured to store the energy charged in the battery.

10. The wireless power device of claim 6, further comprising:
a controller configured to generate the build-up request in response to a determination that the wireless power device requires a high voltage.

11. A voltage generating method of a wireless power receiver, the method comprising:
entering a high-voltage build-up operation mode in response to a build-up request for outputting a high voltage for power supply to the wireless power receiver; and
generating the high voltage from a low voltage by storing energy in a boosting circuit of the wireless power receiver, using a wireless power receiving inductor included in a resonator of the wireless power receiver during the high-voltage build-up operation mode,
wherein the generating of the high voltage comprises:
selectively transmitting, by a switch arrangement circuit of the wireless power receiver, energy to the boosting circuit;
rectifying resonant voltage generated in a first capacitor included in the resonator;
storing, by a second capacitor, the rectified voltage, which is rectified by the switch arrangement circuit;
transmitting, by a diode of the boosting circuit, energy transmitted from the switch arrangement circuit; and
storing, by a third capacitor of the boosting circuit, the transmitted energy by the diode.

12. The voltage generating method of claim 11, wherein the generating of the high voltage comprises iteratively transmitting the stored energy to an energy storage, until a voltage stored in the energy storage reaches the high voltage, to generate the high voltage.

13. The voltage generating method of claim 11, wherein the generating the high voltage includes providing, to the wireless power receiving inductor, at least one of energy corresponding to a resonant voltage generated by the resonator or energy charged in a battery.

14. The voltage generating method of claim 13, wherein the generating of the high voltage comprises transmitting the stored energy, including the energy charged in the battery, in the wireless power receiving inductor to an energy storage, and transmitting, to the energy storage, energy stored in at least one of a first capacitor configured to store the resonant voltage or the second capacitor configured to store the energy charged in the battery.

15. The voltage generating method of claim 11, further comprising:
generating the build-up request in response to a determination that the high voltage is required by the wireless power receiver.

16. The voltage generating method of claim 11,
wherein the generating of the high voltage is performed during wireless power transmission of energy to the wireless power receiving inductor from a wireless power transmitter, and
wherein the stored energy from the wireless power receiver is previously stored energy provided by the wireless power receiving inductor during the wireless power transmission.

17. The voltage generating method of claim 16, wherein the previously stored energy is energy available to the wireless power receiver, as a power supply to the wireless power receiver, for a low voltage operation.

* * * * *